US012670188B2

(12) United States Patent
Degtyar et al.

(10) Patent No.: US 12,670,188 B2
(45) Date of Patent: Jun. 30, 2026

(54) MAP DATA VISUALIZATIONS WITH MULTIPLE SUPERIMPOSED MARKS LAYERS

(71) Applicant: Tableau Software, LLC, Seattle, WA (US)

(72) Inventors: Rodion Degtyar, Sammamish, WA (US); Bryan Alexander Feddern, Seattle, WA (US); Steven Richard Hollasch, Redmond, WA (US); Raphael Hsieh, Seattle, WA (US); Lauren Lea Jackson, Vancouver (CA); Dirk Karis, Seattle, WA (US); Vladimir Kondrashov, Woodinville, WA (US); Ashwin Kumar, Seattle, WA (US); Jialin Le, Kirkland, WA (US); John Michael Lounsbery, Seattle, WA (US); Kent Marten, Victoria (CA); Patrick Kenneth McKay, Redmond, WA (US); Jonathan D. Que, Seattle, WA (US); Yang Su, Bellevue, WA (US); Dan Zheng, Bellevue, WA (US); Roger Bruce Dubbs, III, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 380 days.

(21) Appl. No.: 18/229,159

(22) Filed: Aug. 1, 2023

(65) Prior Publication Data

US 2023/0377228 A1 Nov. 23, 2023

Related U.S. Application Data

(63) Continuation of application No. 17/366,008, filed on Jul. 1, 2021, now Pat. No. 11,715,245.

(Continued)

(51) Int. Cl.
*G06T 11/60* (2026.01)
*G06F 3/04817* (2022.01)
(Continued)

(52) U.S. Cl.
CPC .......... *G06T 11/60* (2013.01); *G06F 3/04817* (2013.01); *G06F 3/0482* (2013.01);
(Continued)

(58) Field of Classification Search
CPC ....... G06T 2200/24; G06T 3/40; G06T 11/60; G06F 3/0482; G06F 3/04817; G06F 16/29
See application file for complete search history.

(56) References Cited

U.S. PATENT DOCUMENTS

| | | | | |
|---|---|---|---|---|
| 7,800,613 | B2 * | 9/2010 | Hanrahan | ............. G06F 16/248 |
| | | | | 345/440 |
| 8,140,586 | B2 * | 3/2012 | Stolte | .................... G06F 16/252 |
| | | | | 707/786 |

(Continued)

OTHER PUBLICATIONS

Crosier, Scott et al., "Getting Started with ArcGIS," 2005, ArcGIS 9, XP055877358, retrieved from.http://downloads.esri.com/support/documentation/ao_/1003Getting_Started_ with_ArcGIS.pdf, 272 pgs.

(Continued)

*Primary Examiner* — Michelle L Sams
(74) *Attorney, Agent, or Firm* — Morgan, Lewis & Bockius LLP

(57) ABSTRACT
A computing device receives a first user input that includes user selection of a first data field of a data source from a schema information region of a user interface and placement of the first data field into a data visualization region of the user interface. When the first data field corresponds to a geographic data field, the computing device determines longitude and latitude information for data values of the first data field. The computing device generates a map data (Continued)

visualization corresponding to the first data field according to the determined longitude and latitude information. The map data visualization includes a first layer having a first set of data marks corresponding to the first data field. The computing device displays, in the data visualization region, the map data visualization including the first set of data marks.

20 Claims, 51 Drawing Sheets

Related U.S. Application Data

(60) Provisional application No. 63/087,855, filed on Oct. 5, 2020.

(51) Int. Cl.
| | | |
|---|---|---|
| *G06F 3/0482* | (2013.01) | |
| *G06F 16/29* | (2019.01) | |
| *G06T 3/40* | (2006.01) | |

(52) U.S. Cl.
CPC ................ *G06F 16/29* (2019.01); *G06T 3/40* (2013.01); *G06T 2200/24* (2013.01)

(56) References Cited

U.S. PATENT DOCUMENTS

| | | | | |
|---|---|---|---|---|
| 8,799,799 | B1 * | 8/2014 | Cervelli | ................. G06F 16/29 707/723 |
| 10,156,975 | B1 * | 12/2018 | Kim | ..................... G06T 11/206 |
| 2008/0133579 | A1 | 6/2008 | Lim | |
| 2011/0153368 | A1 | 6/2011 | Pierre et al. | |
| 2015/0193630 | A1 | 7/2015 | Von Kaenel et al. | |
| 2016/0148422 | A1 * | 5/2016 | Direkwut | ............ G01C 21/206 345/420 |
| 2016/0283049 | A1 | 9/2016 | Faydi et al. | |
| 2016/0379386 | A1 | 12/2016 | Doeweling et al. | |
| 2019/0361847 | A1 | 11/2019 | Thomson | |

OTHER PUBLICATIONS

Degtyar, Office Action, U.S. Appl. No. 17/366,008, Dec. 7, 2022, 21 pgs.

Degtyar, Notice of Allowance, U.S. Appl. No. 17/366,008, Mar. 15, 2023, 11 pgs.

Smoak, Anthony, "Create A Map with Multiple Layers in Tableau", https://www.youtube.com/watch?v=bwUj2NZHTC4, Jul. 3, 2017. (Year: 2017).

Tableau Software, LLC, International Search Report and Written Opinion, PCT/US2021/053566, Jan. 24, 2022, 12 pgs.

* cited by examiner

200

202 — CPU(s)

Memory 214

| Operating System | 216 |
| Communications Module | 218 |
| Web Browser | 220 |
| Data Visualization Application | 222 |

212

206

User interface

Display — 208

Input Device / Mechanism — 210

204 — Communication interface(s)

| Graphical User Interface | 100 |
| Data Visualization Generation Module | 226 |
| Summary Module | 227 |
| Visual Specification(s) | 228 |

⋮

| Database / Data Sources | 240 |
| Data Source 1 | 240-1 |
| Data Source 2 | 240-2 |

⋮

410

110

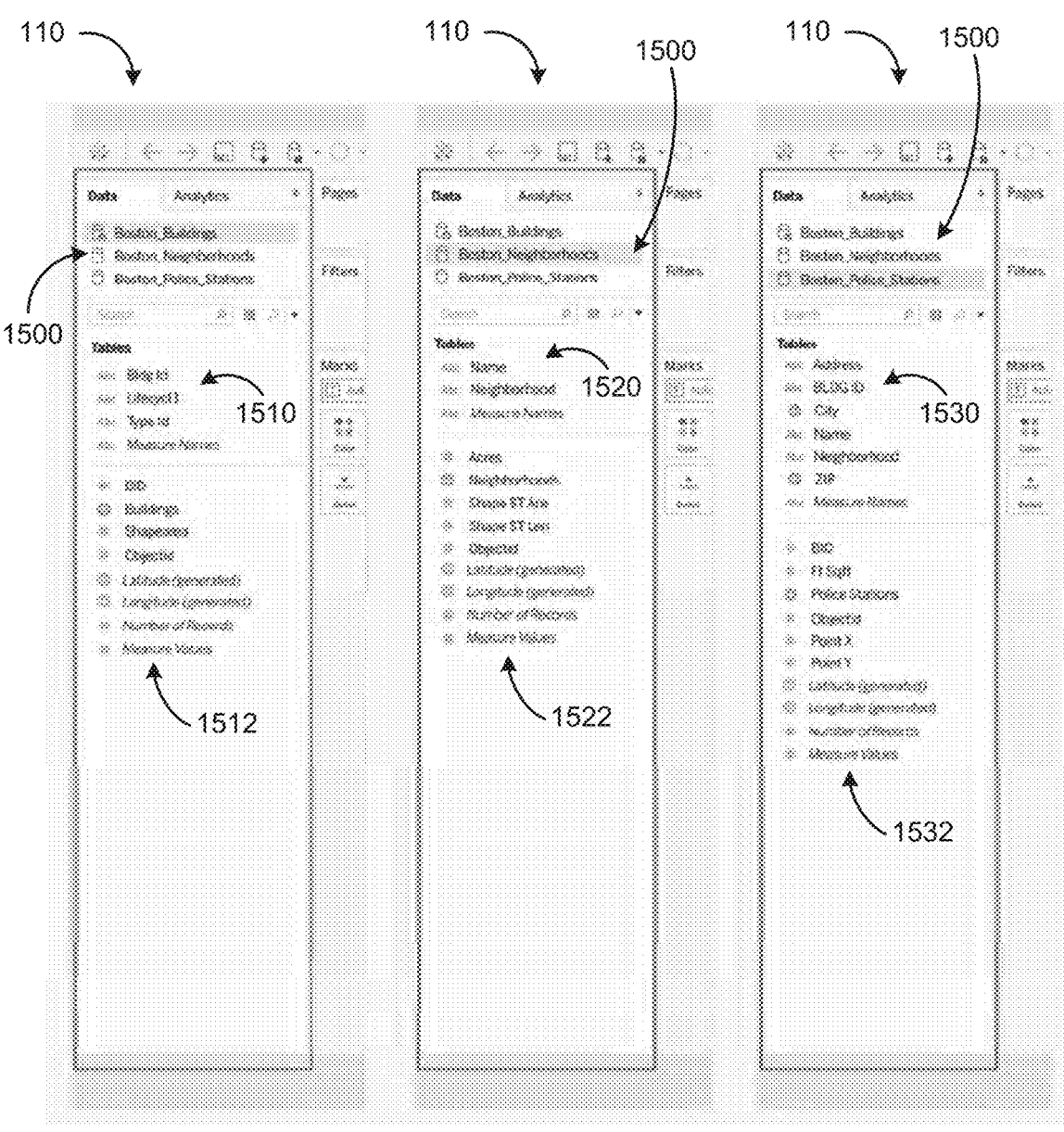
Figure 15B      Figure 15C      Figure 15D

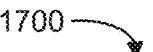

1700

1702 A method for generating map data visualizations with multiple map layers is performed at a computing device having a display, one or more processors, and memory storing one or more programs configured for execution by the one or more processors.

1704 Receive user selection of a data source with geographic data.

1706 Display a data visualization user interface, including a schema information region having a plurality of user-selectable data fields, a data visualization region, and a plurality of shelf regions. Each shelf defines a respective characteristic of a data visualization to be displayed in the data visualization region.

1708 Receive a first user input to place a first geographic data field from the schema information region into the data visualization region.

1720 In response to the first user input:

1722 Generate and display a map data visualization in the data visualization region using coordinates associated with the first geographic data field. The map data visualization includes a first plurality of data marks in a first layer.

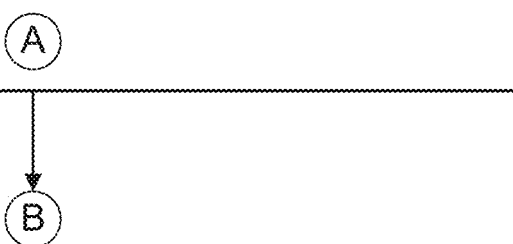

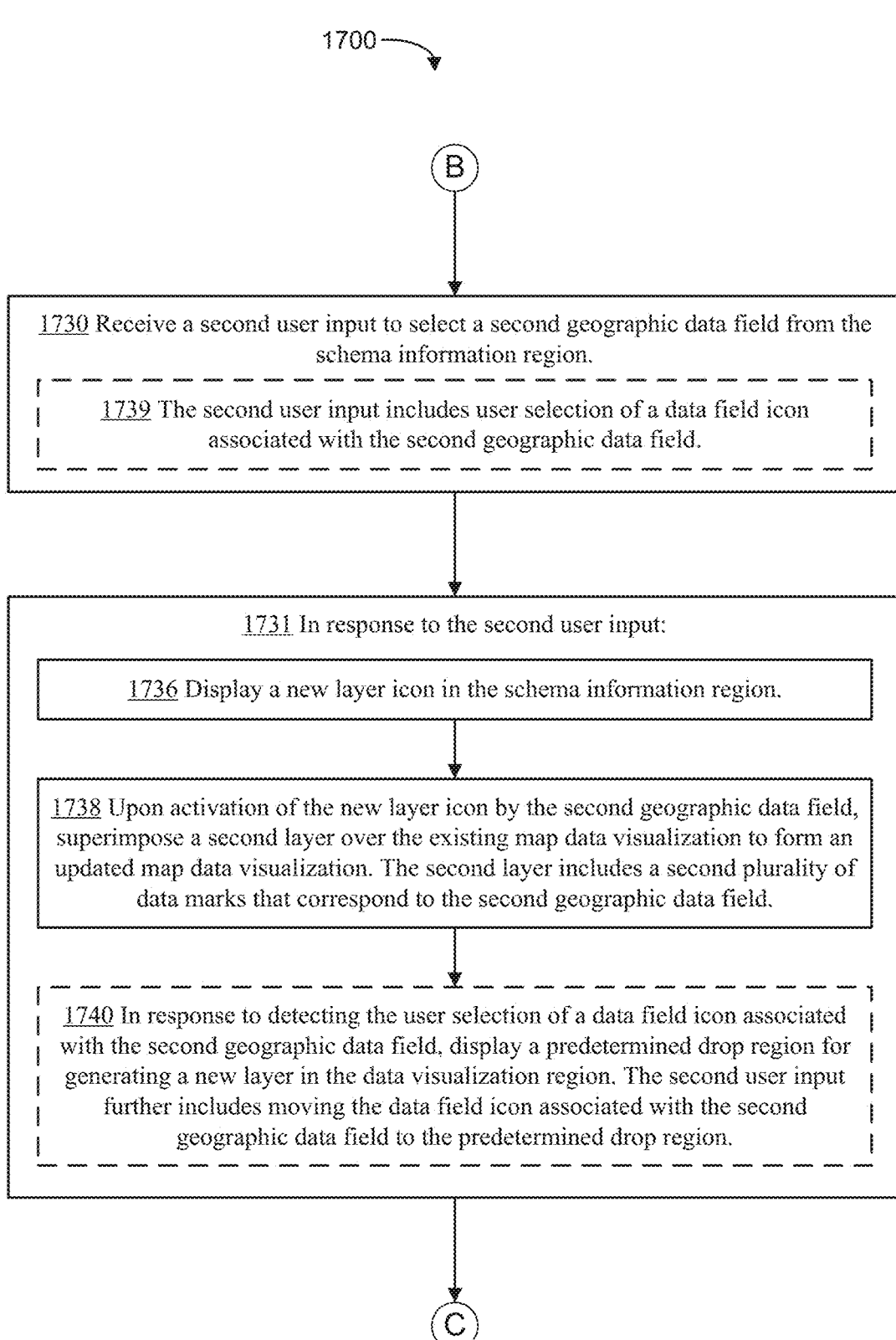

B

1730 Receive a second user input to select a second geographic data field from the schema information region.

1739 The second user input includes user selection of a data field icon associated with the second geographic data field.

1731 In response to the second user input:

1736 Display a new layer icon in the schema information region.

1738 Upon activation of the new layer icon by the second geographic data field, superimpose a second layer over the existing map data visualization to form an updated map data visualization. The second layer includes a second plurality of data marks that correspond to the second geographic data field.

1740 In response to detecting the user selection of a data field icon associated with the second geographic data field, display a predetermined drop region for generating a new layer in the data visualization region. The second user input further includes moving the data field icon associated with the second geographic data field to the predetermined drop region.

1732 Associate a longitude data field, corresponding to the first geographic data field, with a first shelf region of the plurality of shelf regions.

1733 Associate a latitude data field, corresponding to the first geographic data field, with a second shelf region of the plurality of shelf regions. The second shelf region is distinct from the first shelf region.

1734 Display a first data field icon associated with the longitude data field in the first shelf region.

1735 Display a second data field icon associated with the latitude data field in the second shelf region.

Figure 17C

1700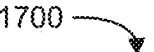

<u>1742</u> Receive a third user input to (i) select a third geographic data field from the schema information region and (ii) place the third geographic data field onto a mark encoding shelf for the second layer.

<u>1744</u> In response to the third user input, encode the second plurality of data marks according to the mark encoding shelf while maintaining the first plurality of data marks without encoding according to the mark encoding shelf.

<u>1746</u> Receive one or more user inputs at a mark encoding shelf for the first layer to change encoding of the first plurality of data marks in a first layer.

<u>1748</u> In response to receiving the one or more user inputs at the mark encoding shelf for the first layer, encode the first plurality of data marks according to the one or more user inputs at the mark encoding shelf for the first layer while maintaining the second plurality of data marks in accordance with a mark encoding shelf for the second layer.

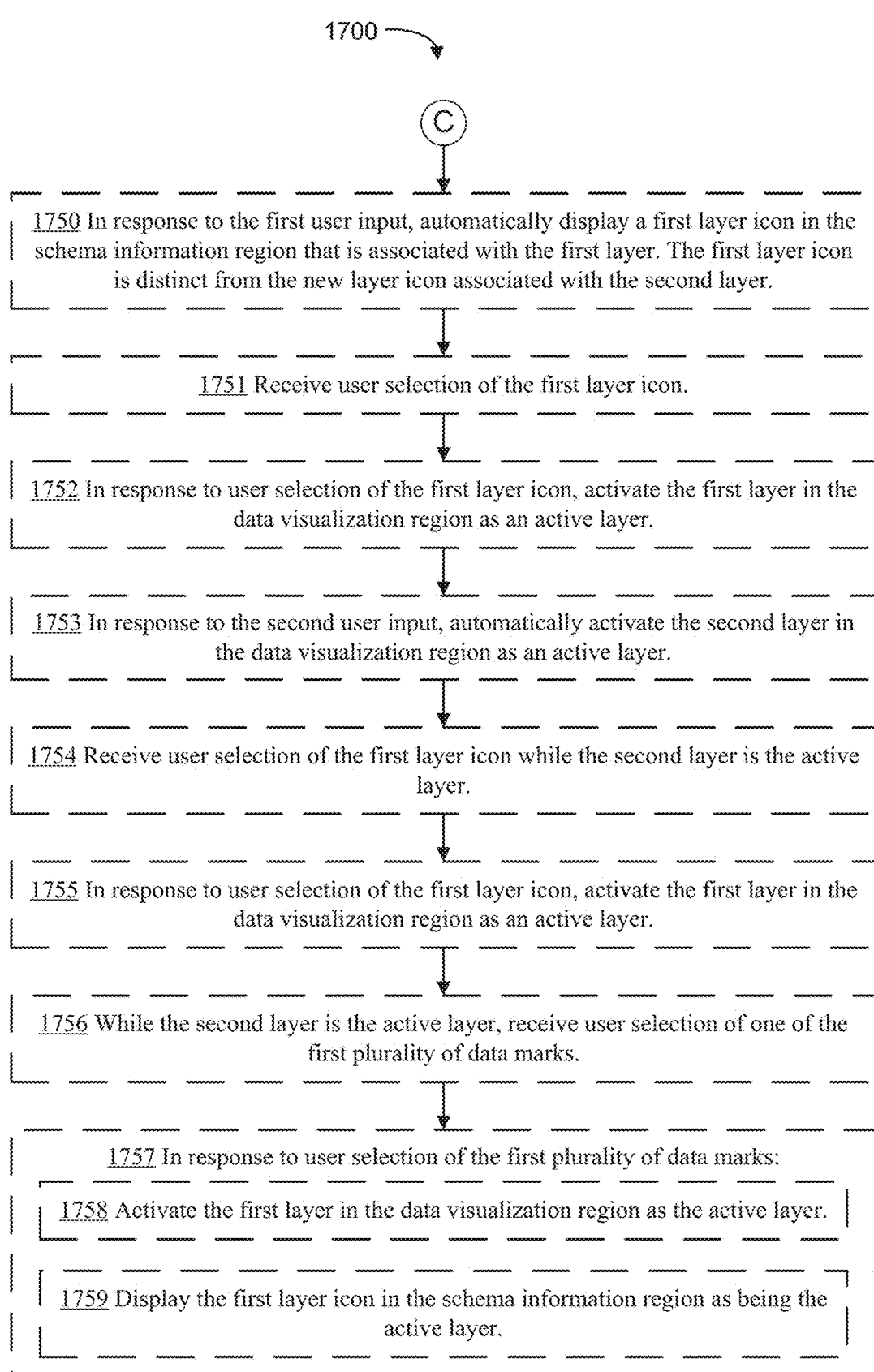

Ⓒ

1750 In response to the first user input, automatically display a first layer icon in the schema information region that is associated with the first layer. The first layer icon is distinct from the new layer icon associated with the second layer.

1751 Receive user selection of the first layer icon.

1752 In response to user selection of the first layer icon, activate the first layer in the data visualization region as an active layer.

1753 In response to the second user input, automatically activate the second layer in the data visualization region as an active layer.

1754 Receive user selection of the first layer icon while the second layer is the active layer.

1755 In response to user selection of the first layer icon, activate the first layer in the data visualization region as an active layer.

1756 While the second layer is the active layer, receive user selection of one of the first plurality of data marks.

1757 In response to user selection of the first plurality of data marks:

1758 Activate the first layer in the data visualization region as the active layer.

1759 Display the first layer icon in the schema information region as being the active layer.

Figure 17E

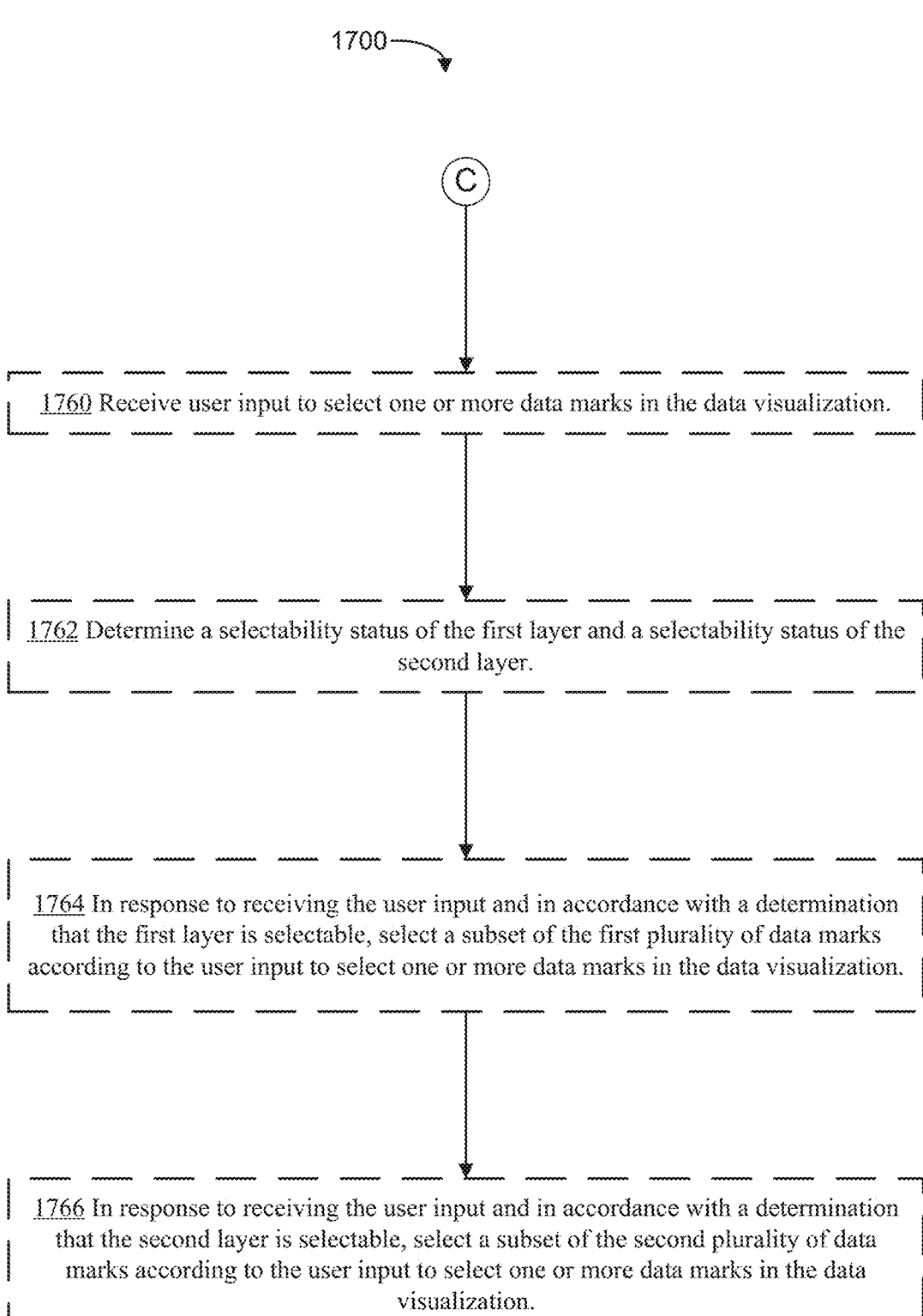

1700

C

1760 Receive user input to select one or more data marks in the data visualization.

1762 Determine a selectability status of the first layer and a selectability status of the second layer.

1764 In response to receiving the user input and in accordance with a determination that the first layer is selectable, select a subset of the first plurality of data marks according to the user input to select one or more data marks in the data visualization.

1766 In response to receiving the user input and in accordance with a determination that the second layer is selectable, select a subset of the second plurality of data marks according to the user input to select one or more data marks in the data visualization.

Figure 17F

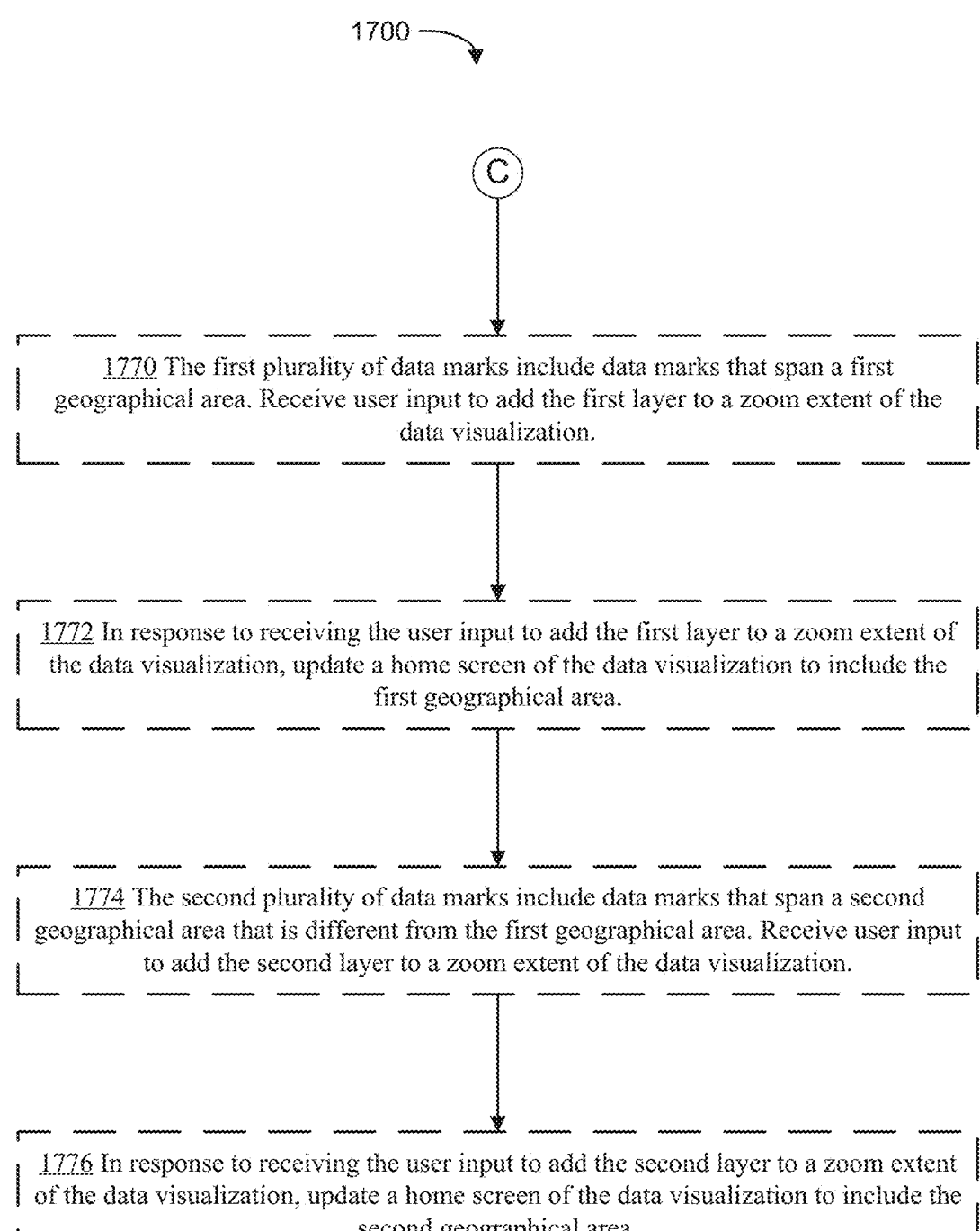

1700

C

1770 The first plurality of data marks include data marks that span a first geographical area. Receive user input to add the first layer to a zoom extent of the data visualization.

1772 In response to receiving the user input to add the first layer to a zoom extent of the data visualization, update a home screen of the data visualization to include the first geographical area.

1774 The second plurality of data marks include data marks that span a second geographical area that is different from the first geographical area. Receive user input to add the second layer to a zoom extent of the data visualization.

1776 In response to receiving the user input to add the second layer to a zoom extent of the data visualization, update a home screen of the data visualization to include the second geographical area.

Figure 17G

MAP DATA VISUALIZATIONS WITH MULTIPLE SUPERIMPOSED MARKS LAYERS

RELATED APPLICATIONS

This application is a continuation of U.S. patent application Ser. No. 17/366,008, filed Jul. 1, 2021, entitled "Map Data Visualizations with Multiple Superimposed Marks Layers," which claims priority to U.S. Provisional Application No. 63/087,855, filed Oct. 5, 2020, entitled "Map Data Visualizations with Multiple Superimposed Marks Layers," each of which is hereby incorporated by reference in its entirety.

TECHNICAL FIELD

The disclosed implementations relate generally to data visualization and more specifically to systems, methods, and user interfaces that enable users to generate map data visualizations and analyze map data.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. In some cases, users use map data visualizations to view data that has geographic data. However, data visualization interfaces for maps are often limited.

SUMMARY

Accordingly, implementations of the present invention are directed to data visualization user interfaces that can display multiple map layers.

In accordance with some implementations, a method executes at an electronic device with a display, one or more processors, and memory. For example, the electronic device can be a smart phone, a tablet, a notebook computer, or a desktop computer. The device receives user selection of a data source with geographic data and displays a data visualization user interface, including displaying a schema information region having a plurality of user-selectable data fields, displaying a data visualization region, and displaying a plurality of shelf regions. Each shelf of the plurality of shelf regions defines a respective characteristic of a data visualization to be displayed in the data visualization region. The device then receives a first user input to place a first geographic data field from the schema information region into the data visualization region. In response to the first user input, the device generates and displays a map data visualization in the data visualization region using coordinates associated with the first geographic data field. The map data visualization includes a first plurality of data marks in a first layer. The device then receives a second user input to select a second geographic data field from the schema information region. In response to the second user input, the device displays a new layer icon in the schema information region, and, upon activation of the new layer icon by the second geographic data field, the device superimposes a second layer over the existing map data visualization to form an updated map data visualization. The second layer includes a second plurality of data marks that correspond to the second geographic data field.

In some implementations, the device receives a third user input to: (i) select a third geographic data field from the schema information region and (ii) place the third geographic data field onto a mark encoding shelf for the second layer. In response to the third user input, the device encodes the second plurality of data marks according to the mark encoding shelf while maintaining the first plurality of data marks without encoding according to the mark encoding shelf.

In some implementations, the second user input includes user selection of a data field icon associated with the second geographic data field. In response to detecting the user selection of the data field icon associated with the second geographic data field, the device displays a predetermined drop region for generating a new layer in the data visualization region. The second user input further includes moving the data field icon associated with the second geographic data field to the predetermined drop region.

In some implementations, in response to the first user input, the device associates a longitude data field that corresponds to the first geographic data field with a first shelf region of the plurality of shelf regions. The device also associates a latitude data field that corresponds to the first geographic data field with a second shelf region of the plurality of shelf regions. The second shelf region is distinct from the first shelf region. The device also displays a first data field icon associated with the longitude data field in the first shelf region and displays a second data field icon associated with the latitude data field in the second shelf region.

In some implementations, the device receives one or more user inputs at a mark encoding shelf for the first layer to change encoding of the first plurality of data marks in a first layer. In response to receiving the one or more user inputs at the mark encoding shelf for the first layer, the device encodes the first plurality of data marks according to the one or more user inputs at the mark encoding shelf for the first layer while maintaining the second plurality of data marks in accordance with a mark encoding shelf for the second layer.

In some implementations, in response to the first user input, the device automatically displays a first layer icon in the schema information region. The first layer icon is associated with the first layer. The first layer icon is distinct from the new layer icon associated with the second layer.

In some implementations, the device receives user selection of the first layer icon. In response to user selection of the first layer icon, the device activates the first layer in the data visualization region as the active layer.

In some implementations, in response to the second user input, the device automatically activates the second layer in the data visualization region as the active layer.

In some implementations, the device receives user selection of the first layer icon while the second layer is the active layer. In response to user selection of the first layer icon, the device activates the first layer in the data visualization region as the active layer.

In some implementations, while the second layer is the active layer, the device receives user selection of one of the first plurality of data marks. In response to user selection of one of the first plurality of data marks, the device activates the first layer in the data visualization region as the active layer and displays the first layer icon in the schema information region as being the active layer.

In some implementations, the device receives user input to select one or more data marks in the data visualization and determines a selectability status of the first layer and a selectability status of the second layer. In response to receiving the user input and in accordance with a determination that the first layer is selectable, the device selects a subset of the first plurality of data marks according to the user input to select one or more data marks in the data visualization. In response to receiving the user input and in accordance with a determination that the second layer is selectable, the device selects a subset of the second plurality of data marks according to the user input to select one or more data marks in the data visualization.

In some implementations, the first plurality of data marks include data marks that span a first geographical area. The device receives user input to add the first layer to a zoom extent of the data visualization. The zoom extent specifies which map layers determine a default zoom level for the data visualization. In response to receiving the user input to add the first layer to a zoom extent of the data visualization, the device updates the home screen of the data visualization to include the first geographical area.

In some implementations, the second plurality of data marks include data marks that span a second geographical area that is different from the first geographical area. The device receives user input to add the second layer to the zoom extent of the data visualization. In response to receiving the user input to add the second layer to a zoom extent of the data visualization, the device updates the home screen of the data visualization to include the first geographical area and the second geographical area.

Some implementations provide a computer system with one or more processors and memory. The memory stores one or more programs configured for execution by the processors. The one or more programs include instructions for performing any of the methods described herein.

Some implementations include a computer readable storage medium storing one or more programs configured for execution by a computer system having one or more processors and memory. The one or more programs include instructions for performing any of the methods described herein.

Thus methods, systems, and graphical user interfaces are disclosed that allow users to efficiently generate and modify data visualizations that include map layers.

Additional features and advantages of implementations of the present invention will be set forth in the description that follows, and in part will be apparent from the description, or may be learned by practice of implementations of the present invention. The objectives and other advantages of the present invention may be realized and attained by the structure particularly pointed out in the written description and claims hereof as well as the appended drawings.

Both the foregoing general description and the following detailed description are exemplary and explanatory and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Detailed Description of Implementations below, in conjunction with the following drawings in which like reference numerals refer to corresponding parts throughout the figures.

FIGS. 15B-15D provide examples of a schema information region in a graphical user interface for multiple data sources according to some implementations.

FIGS. 17A-17G provide a flow chart of a method of generating a data visualization of a map according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DETAILED DESCRIPTION OF IMPLEMENTATIONS

Figure 1:
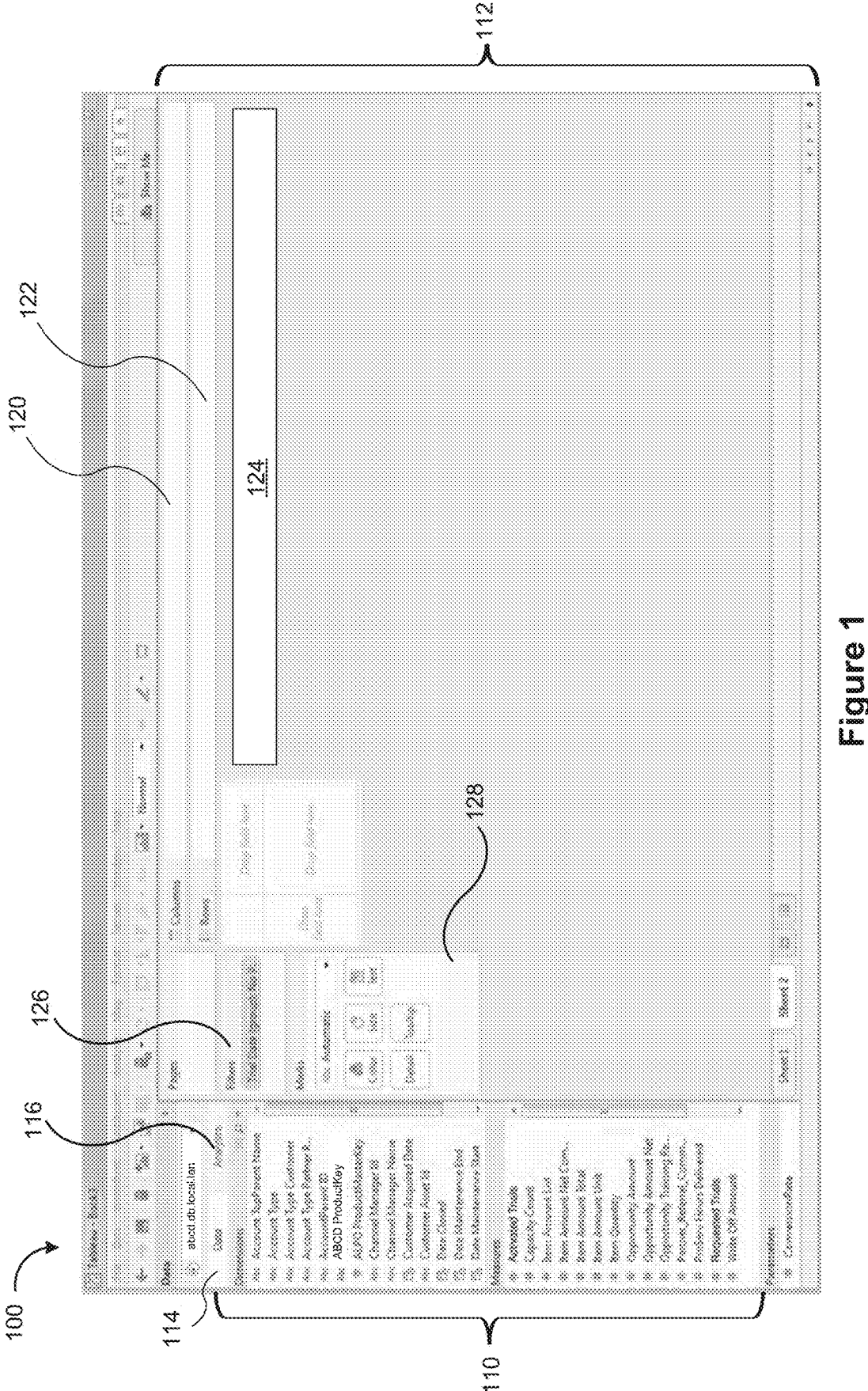
FIG. 1 illustrates a graphical user interface used in some example implementations.

FIG. 1 illustrates a graphical user interface 100 for interactive data analysis. The user interface 100 includes a Data tab 114 and an Analytics tab 116 in accordance with some example implementations. When the Data tab 114 is selected, the user interface 100 displays a schema information region 110, which is also referred to as a data pane. The schema information region 110 provides named data elements (e.g., field names) that may be selected and used to build a data visualization (sometimes referred to more generally as a visual graphic). In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements.

The graphical user interface 100 also includes a data visualization region 112. The data visualization region 112 includes a plurality of shelf regions, such as a columns shelf region 120 and a rows shelf region 122. These are also referred to as the columns shelf region 120 and the row shelf region 122. As illustrated in FIG. 1, the data visualization region 112 also has a large space for displaying a visual graphic. Because no data elements have been selected in the example of FIG. 1, the space initially has no visual graphic. In some implementations, the data visualization region 112 has multiple layers that are referred to as sheets.

The graphical user interface 100 includes a filter region 126, which displays any filter conditions that are applied to the data set of the data visualization displayed in the data visualization region 112. The graphical user interface 100 also includes a marks region 128, which displays information regarding one or more visual marks in a data visualization displayed in the data visualization region 112. The marks region also includes one or more affordances for editing or changing visual marks, such as changing any of the shape, size, selectability, and/or visibility of one or more visual marks that are displayed in the data visualization region 112. In some implementations, such as when the data visualization displayed in the data visualization region 112 includes one or more layers, the marks region 128 may also display the layers of the data visualization (e.g., display tabs or affordances that correspond to layers of the data visualization).

Figure 2:
FIG. 2 is a block diagram of a computing device according to some implementations.

FIG. 2 is a block diagram illustrating a computing device 200 that can display the graphical user interface 100 in accordance with some implementations (e.g., for performing any of the methods described herein). Various examples of the computing device 200 include a desktop computer, a laptop computer, a tablet computer, and other computing devices that have a display and a processor capable of running a data visualization application 222. The computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPUs 202. The memory 214, or alternatively the non-volatile memory devices within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a data visualization application 222, which provides a graphical user interface 100 for a user to construct visual graphics. For example, a user selects one or more data sources 240 (which may be stored on the computing device 200 or stored remotely), selects data fields from the data sources, and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 also includes a summary module 227, which is used for generating a summary of data fields selected by a user. In some implementations, the data visualization application 222 executes as a stand-alone application (e.g., a desktop application). In some implementations, the data visualization application 222 executes within the web browser 220 or another application using web pages provided by a web server; and
- zero or more databases or data sources 240 (e.g., a first data source 240-1 and a second data source 240-2), which are used by the data visualization application 222. In some implementations, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
FIG. 3A illustrates a data visualization of a map according to some implementations.

FIG. 3A provides a data visualization 300 of a map according to some implementations. The graphical user interface 100 displays data visualization 300 that includes a map. In some implementations, the data visualization 300 includes a single map layer. For example, the data visualization 300 illustrates a map of the Boston area that includes visual marks representative of buildings in Boston. In some implementations, the data visualization 300 includes a plurality of map layers, an examples of which is provided with respect to FIG. 3B.

Figure 3B:
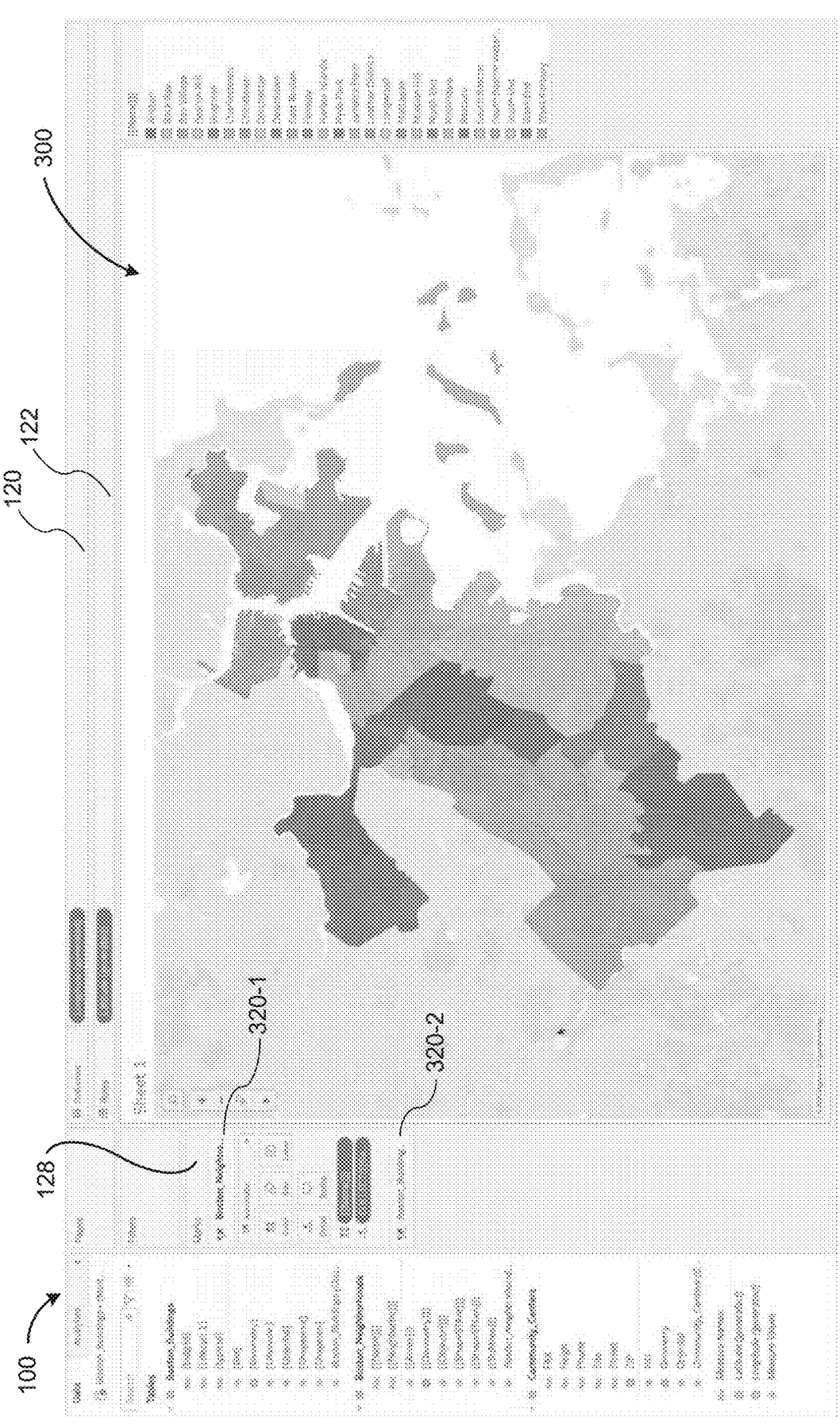
FIG. 3B illustrates a data visualization that includes multiple map layers according to some implementations.

FIG. 3B provides a data visualization 300 that includes multiple map layers according to some implementations. In this example, the data visualization 300 includes a first map layer corresponding to Boston neighborhoods and a second map layer corresponding to buildings in Boston. The marks region 128 identifies a first map layer 320-1 named "Boston_Neighborhoods" and a second map layer 320-2 labeled "Boston_Buildings".

Figure 4A:
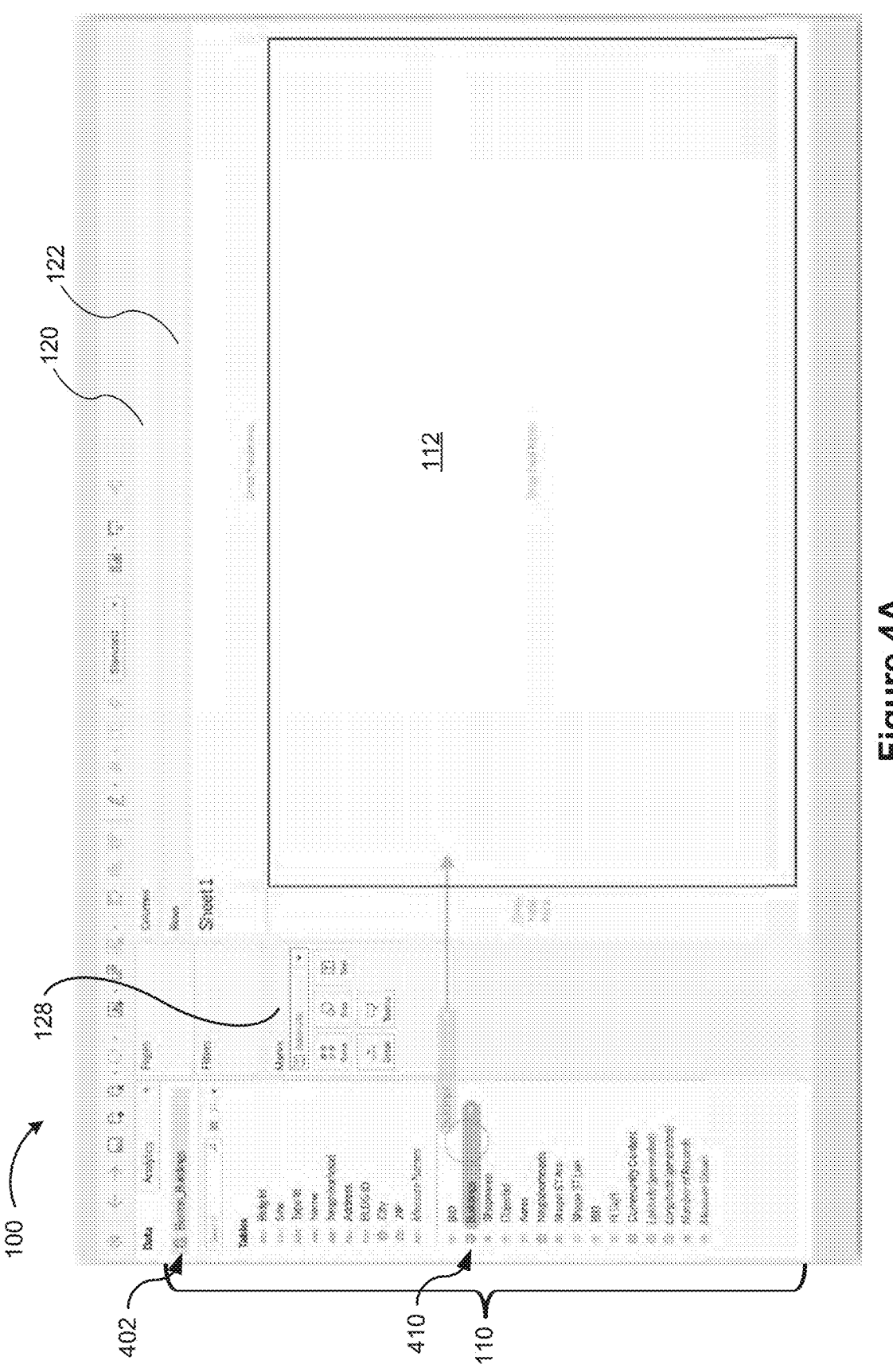
FIGS. 4A-4C illustrate generating a data visualization of a map according to some implementations.
Figure 4B:
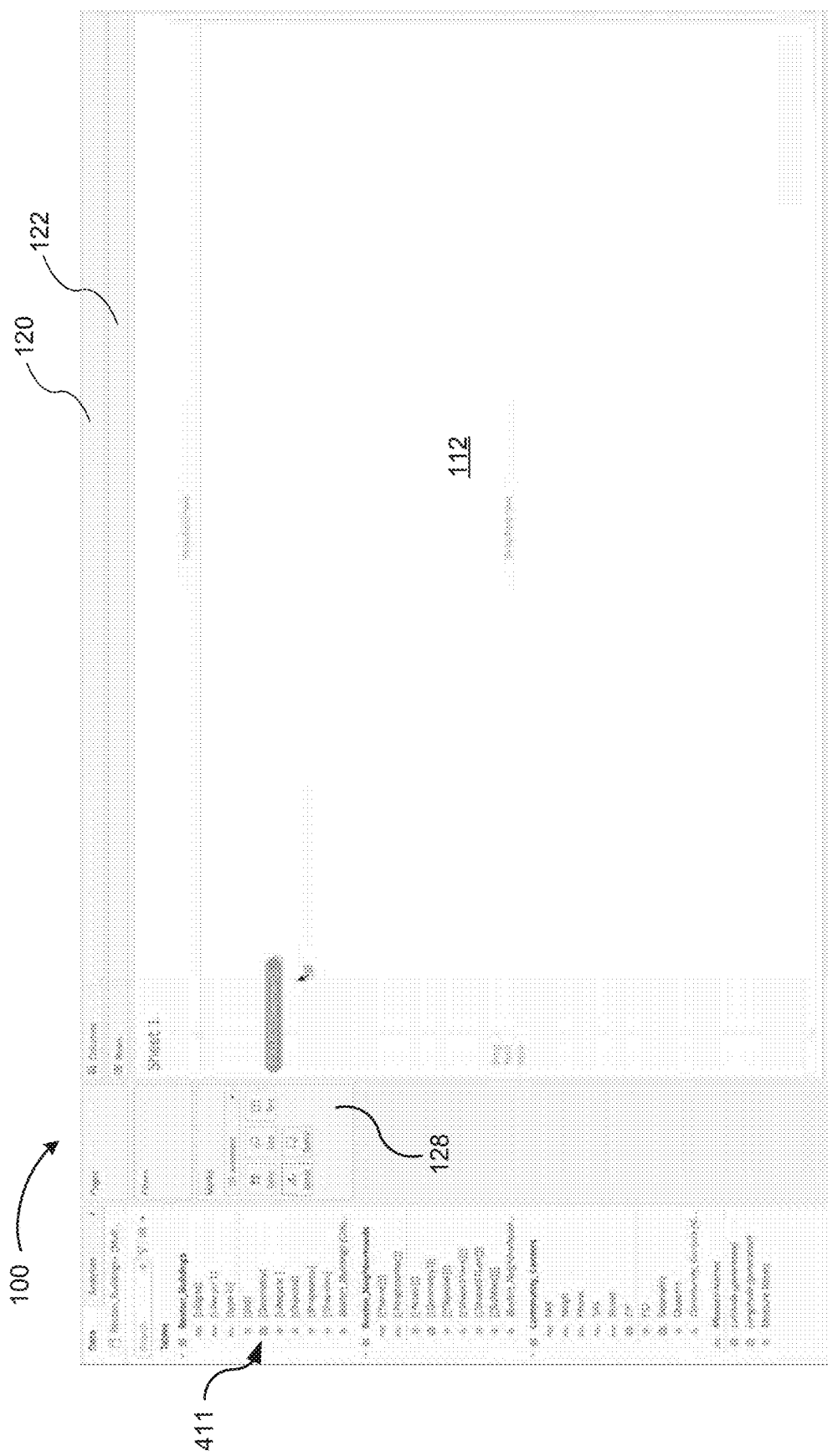
Figure 4C:
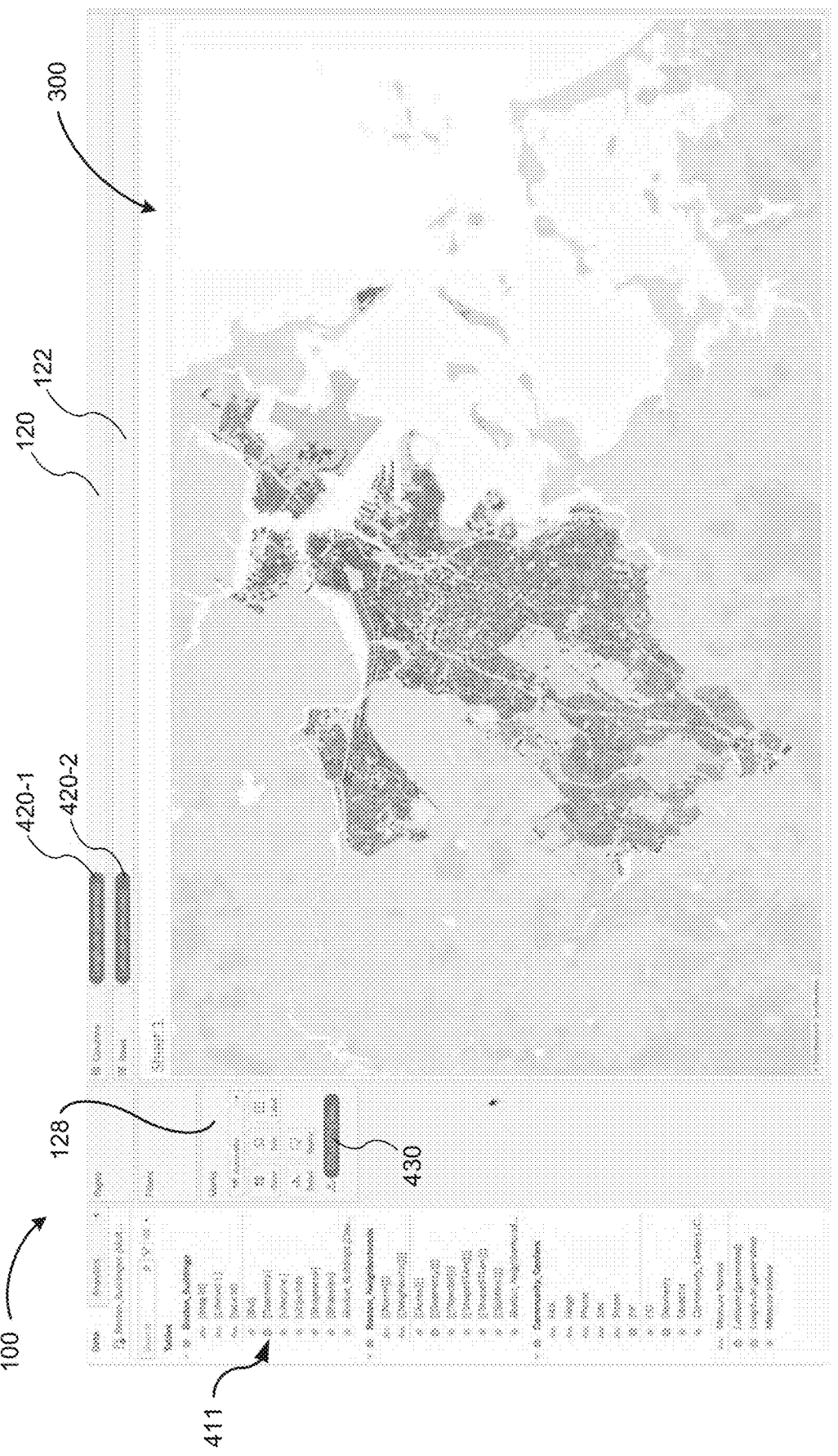

FIGS. 4A-4C illustrate generating a data visualization of a map according to some implementations. A map data visualization, such as the data visualization 300 shown in FIGS. 3A and 3B, can be created (e.g., generated) using information from a data source (e.g., a database). For example, when a data source includes geographical data (e.g., information that includes any of longitude information, latitude information, or global positioning system (GPS) coordinates), the geographic data can be presented as a data visualization that includes a map (e.g., a map data visualization).

FIG. 4A provides an example of the graphical user interface 100 in which data (e.g., data tables) from a data source 402 called "Boston_Buildings" have been loaded. The schema information region 110 displays the name of the data source 402 as well as data tables and data fields from the data source 402. In some implementations, the data tables and data fields are displayed as selectable affordances. In some implementations, as shown in FIG. 4A, a user can select a data table or a data field from the schema information region 110. For example, a user may click (e.g., right click, single click, double click, or tap) on a data field in order to select the data field. In another example, a user may click and hold (e.g., select and drag) the data field from the schema information region 110 to another region of the graphical user interface 100. FIG. 4A shows an example in which a user is dragging the "Buildings" data field 410 (also referred to as the "Boston Buildings data field 410) from the schema information region into the data visualization region 112. In response to the user dragging and dropping the "Buildings" data field 410, the graphical user interface 100 displays a data visualization that includes information from the "Buildings" data field 410.

FIG. 4B provides another example of generating a data visualization by dragging and dropping a "Geometry" data field 411 (from "Boston_Buildings" data table) into the data visualization region 112. In response to the user dragging and dropping the "Geometry" data field 411, the graphical user interface 100 displays a data visualization 300, shown in FIG. 4C, which includes information from the "Geometry" data field 411. The generated data visualization 300 includes visual marks corresponding to information regarding buildings in Boston. In this example, the visual marks include blueprints of buildings in the Boston area.

As shown in FIGS. 4A-4C, the "Buildings" data field 410 and the "Geometry" data field 411 include a visual representation (e.g., a visual icon or a globe-like icon), which indicates that each of the "Buildings" data field 410 and the "Geometry" data field 411 include geographic data.

As shown in FIG. 4C, in addition to generating the data visualization 300, the graphical user interface 100 is also updated to display information regarding the data visualization 300 in the columns shelf region 120, the row shelf region 122, and the marks region 128. In this example, the map data visualization 300 is generated based on a longitude information and a latitude information that is included in the "Geometry" data field 411. A longitude icon 420-1 associated with the longitude information is shown in the columns shelf region 120 and a latitude icon 420-2 associated with the latitude information is shown in the row shelf region 122. Additionally, the marks region 128 displays a visual marks icon 430 corresponding to one or more of the visual marks shown in the data visualization 300. The visual marks icon 430 corresponds to visual marks in the data visualization 300 that are generated in accordance with information in the "Geometry" data field 411.

In some implementations, a layer (e.g., a map layer of a data visualization) that displays visual marks corresponding to geographic data from the first data field added to the data visualization (e.g., the data field used to initially generate the map data visualization) is referred to as the first layer or the base layer. In some implementations, a data visualization may include one layer, in which case, all of the visual marks displayed in the data visualization correspond to the first layer (e.g., the base layer). For example, the data visualization 300 shown in FIG. 4C includes one map layer. The visual marks corresponding to the blueprints of Boston buildings all belong to the same map layer (e.g., all of the visual marks displayed as part of data visualization 300, as shown in FIG. 4C, belong to a same layer).

In some implementations, a data visualization includes a plurality of layers (e.g., two or more map layers). In such cases, the data visualization includes a first subset of visual marks corresponding to a first layer and a second subset of visual marks corresponding to a second layer that is distinct from the first layer. In some implementations, the first subset of visual marks is distinct from the second subset of visual marks. In some implementations, the first subset of visual marks differs from the second subset of visual marks by at least one visual mark. In some implementations, the first subset of visual marks and the second subset of visual marks do not include any common visual marks. For example, if a user updates the data visualization 300 to display additional information, such as geographic data from another data field, visual marks corresponding to the additional information may belong to a second layer that is different from the first layer. In such cases, the data visualization would include a first subset of visual marks corresponding to a first data field and the first layer, and a second subset of visual marks corresponding to a second data field that is distinct from the first data field and the second layer that is distinct from the first layer.

The examples provided with respect to FIGS. 4A-4C describe methods of generating a map data visualization 300 using geographic data from a data source. In some implementations, additional information can also be added to the data visualization 300. For example, other geographic data can be used to add (e.g., create or generate) new layers with new visual marks to the existing data visualization 300. Examples of adding information to data visualization 300 in the form of new layers (e.g., new map layers) is provided with respect to FIGS. 5A-5C.

Figure 5A:
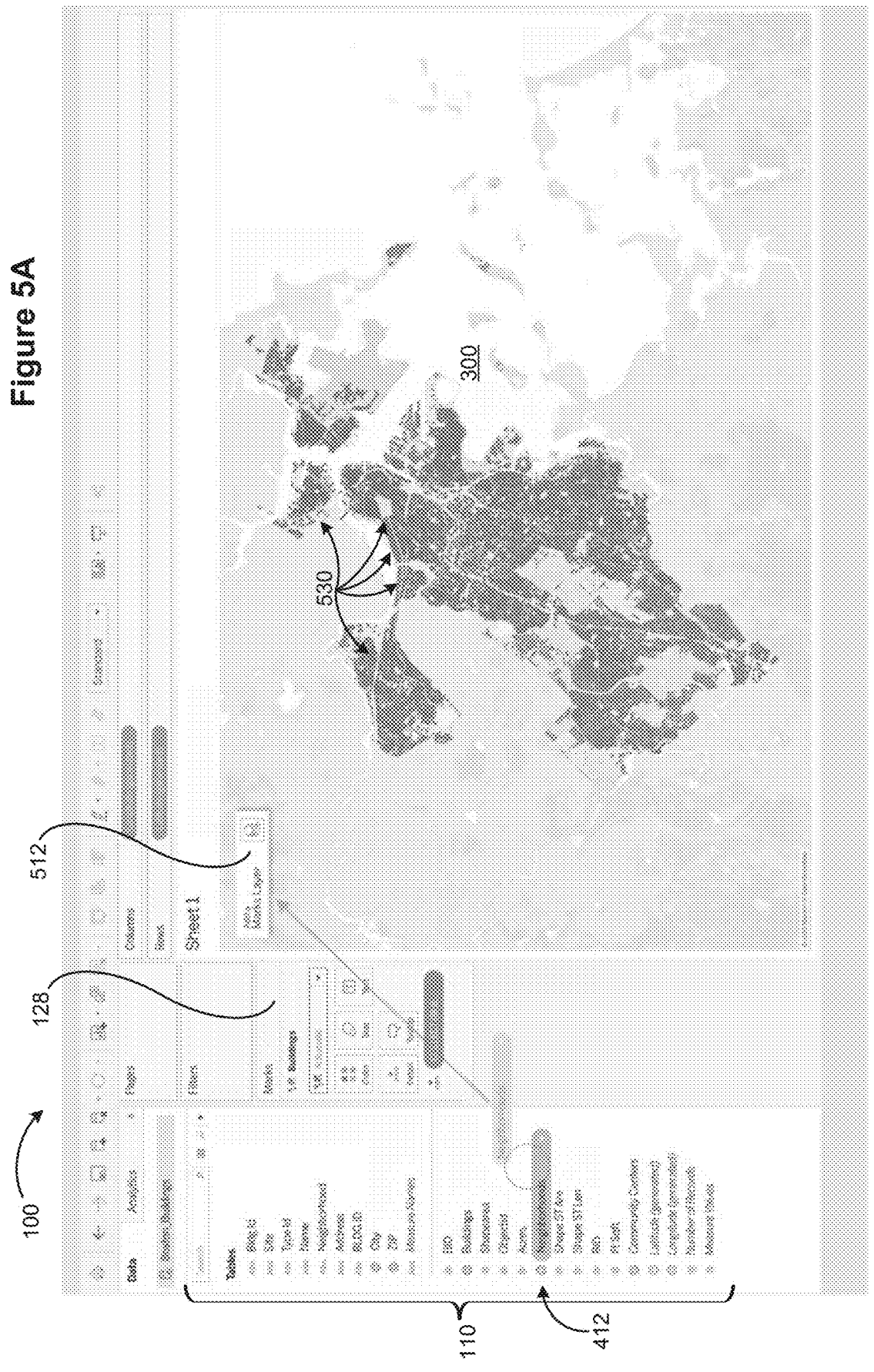
FIGS. 5A-5C illustrate generating map layers in a data visualization of a map according to some implementations.
Figure 5B:
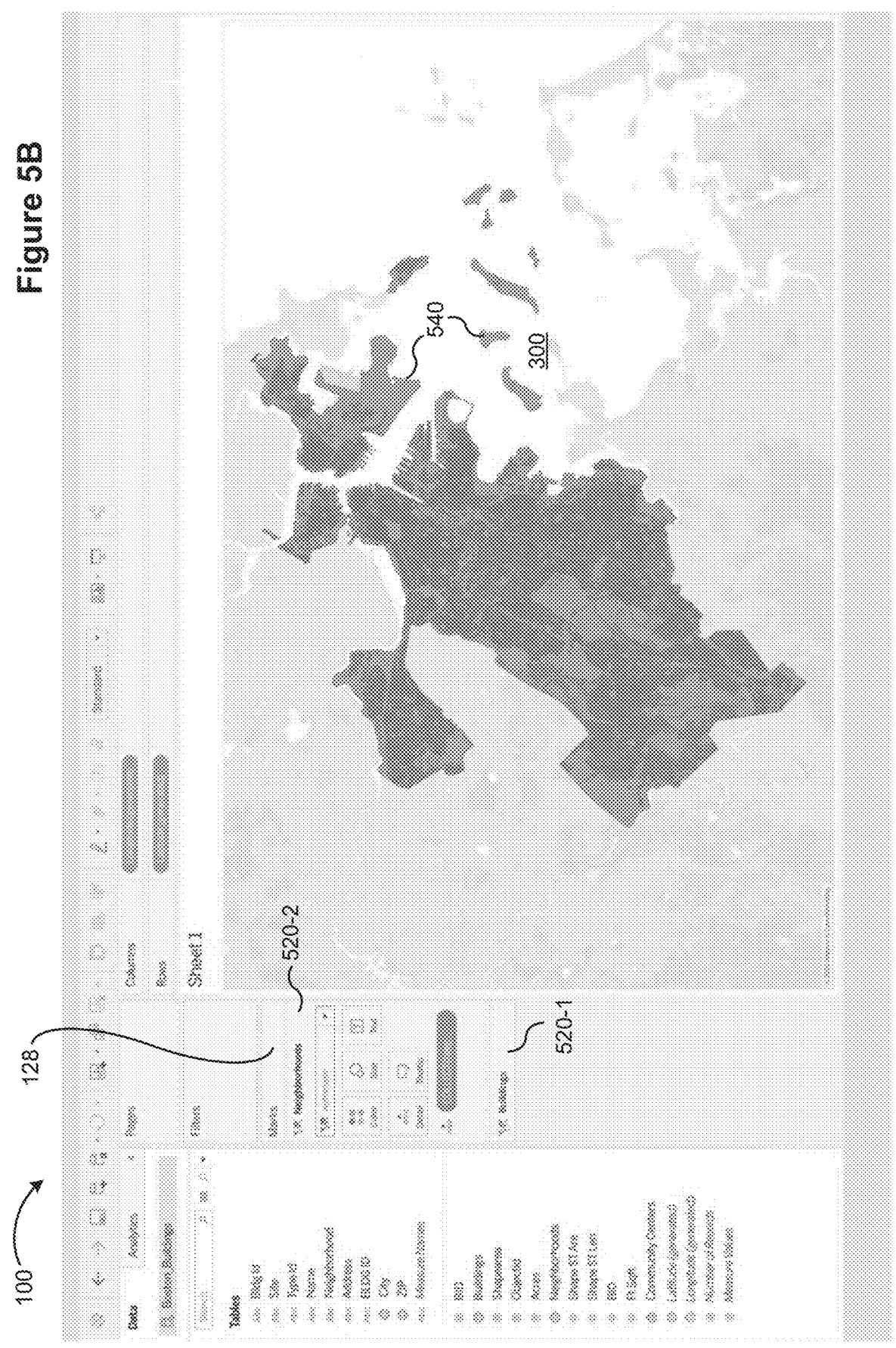
Figure 5C:
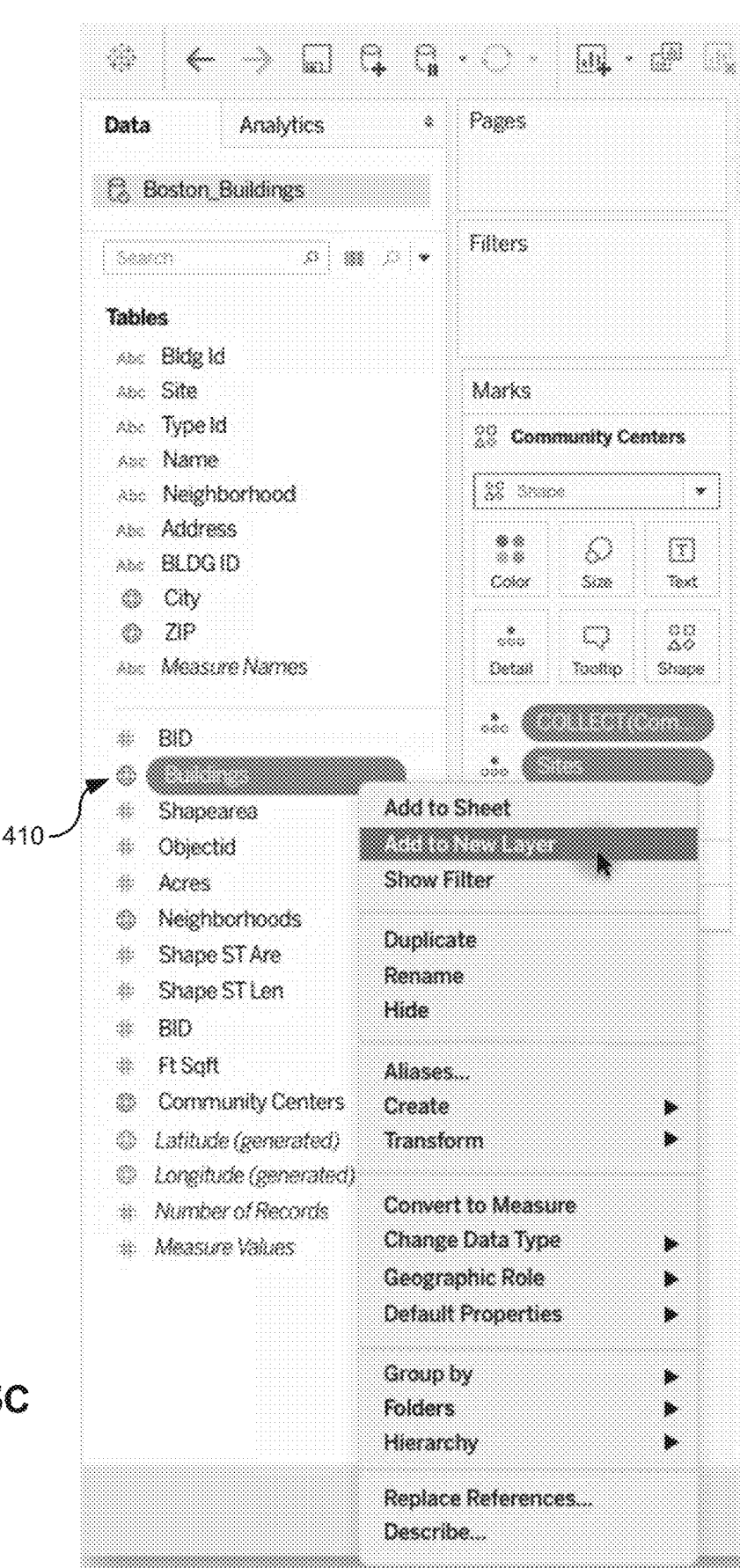

FIGS. 5A-5C illustrate generating map layers in a data visualization 300 of a map according to some implementations.

The data visualization 300 shown in FIG. 5A shows a first set of visual marks 530 (e.g. building locations or building blueprints) corresponding to the "Boston Buildings" data field 410. The first set of visual marks 530 corresponds to (e.g., belongs to or is associated with) a first layer (e.g., the base layer) of the data visualization 300.

FIG. 5A illustrates receiving a user input to place the "Neighborhoods" data field 412 at an affordance 512 for adding a new map layer (e.g., dragging the "Neighborhoods" data field 412 from the schema information region 110 and dropping the "Neighborhoods" data field 412 at the affordance 512 for adding a new layer). In response to placement of the "Neighborhoods" data field 412 at the affordance 512, the data visualization 300 is automatically (e.g., independently of additional user input) updated in accordance with information (e.g., geographic data) included in the "Neighborhoods" data field 412.

As shown in FIG. 5B, the data visualization 300 is updated to include second set of visual marks 540 that are part of a second map layer. In this example, the second set of visual marks 540 in the second layer is displayed in the data visualization 300 as regions on the map that are emphasized (e.g., shadowed, highlighted, or shaded) in accordance with the geographic data from the "Neighborhoods" data field 412. Additionally, the marks region 128 is also updated to designate layers 520-1 and 520-2. The first layer 520-1 (e.g., the base layer, the first map layer, or the original layer) corresponds to the "Boston Buildings" data field 410 (also referred to in FIG. 4A as the "Buildings data field 410). The second layer 520-2 corresponds to the "Boston Neighborhoods" data field 412. In some implementations, the order in which the layers (e.g., layers 520-1 and 520-2) are displayed is based on the order in which the layers are added to the data visualization. For example, as shown in FIG. 5B, in the marks region 128, the second layer 520-2 (e.g., layer icon 520-2) is displayed above the first layer 520-1 (e.g., layer icon 520-1) since the second layer (e.g., the new layer corresponding to the "Boston Neighborhoods" data field 412) is added to the data visualization 300 after the first layer (e.g., the base layer corresponding to the "Boston Buildings" data field 410).

In some implementations, in response to receiving user selection of a respective layer (e.g., the layer 520-1 or the layer 520-2), the marks region 128 is updated to display an expanded view of the selected layer, including displaying additional information and affordances corresponding to the selected layer. In some implementations, in response to receiving user input to add a new layer to the data visualization 300, the marks region 128 automatically updates to display the new layer (e.g., displaying an affordance corresponding to the new layer) and automatically displays an expanded view of the layer. For example, as shown in FIG. 5B, in response receiving the user input to add a second layer corresponding to the "Boston Neighborhoods" data field 412, the marks region 128 is updated to display layers 520-1 and 520-2, and the marks region 128 automatically displays an expanded view of the second layer 520-2, which includes one of more affordances for editing the second set of visual marks 540 that correspond to (e.g., belong to) the second layer of the data visualization 300.

In some implementations, in response to receiving user input to add a new layer, the new layer is automatically the active layer (e.g., such that any user input received at the data visualization 300 or in the data visualization region 112 corresponds to selections or actions to visual marks associated with the new layer.

FIG. 5C illustrates another method of adding a layer to a data visualization 300. A new layer can be added to data visualization 300 by selecting the "Add to New Layer" selection from a drop down menu corresponding to a data field in the schema information region 110. In this example, a user selects (e.g., right clicks, option-selects) the "Buildings" data field 410. In response to the user's selection, the graphical user interface 100 displays a drop down menu (e.g., pop-up menu) corresponding to the "Buildings" data field 410. In response to receiving a user selection of the "Add to New Layer" option in the drop down menu, the data visualization 300 is updated to display information from the "Buildings" data field 410 (e.g., to display visual marks showing blueprints of buildings in Boston). The marks region 128 of the graphical user interface 100 is also updated, as described above with respect to FIG. 5B, in response to receiving the user input to add a new layer to the data visualization.

Figure 6A:
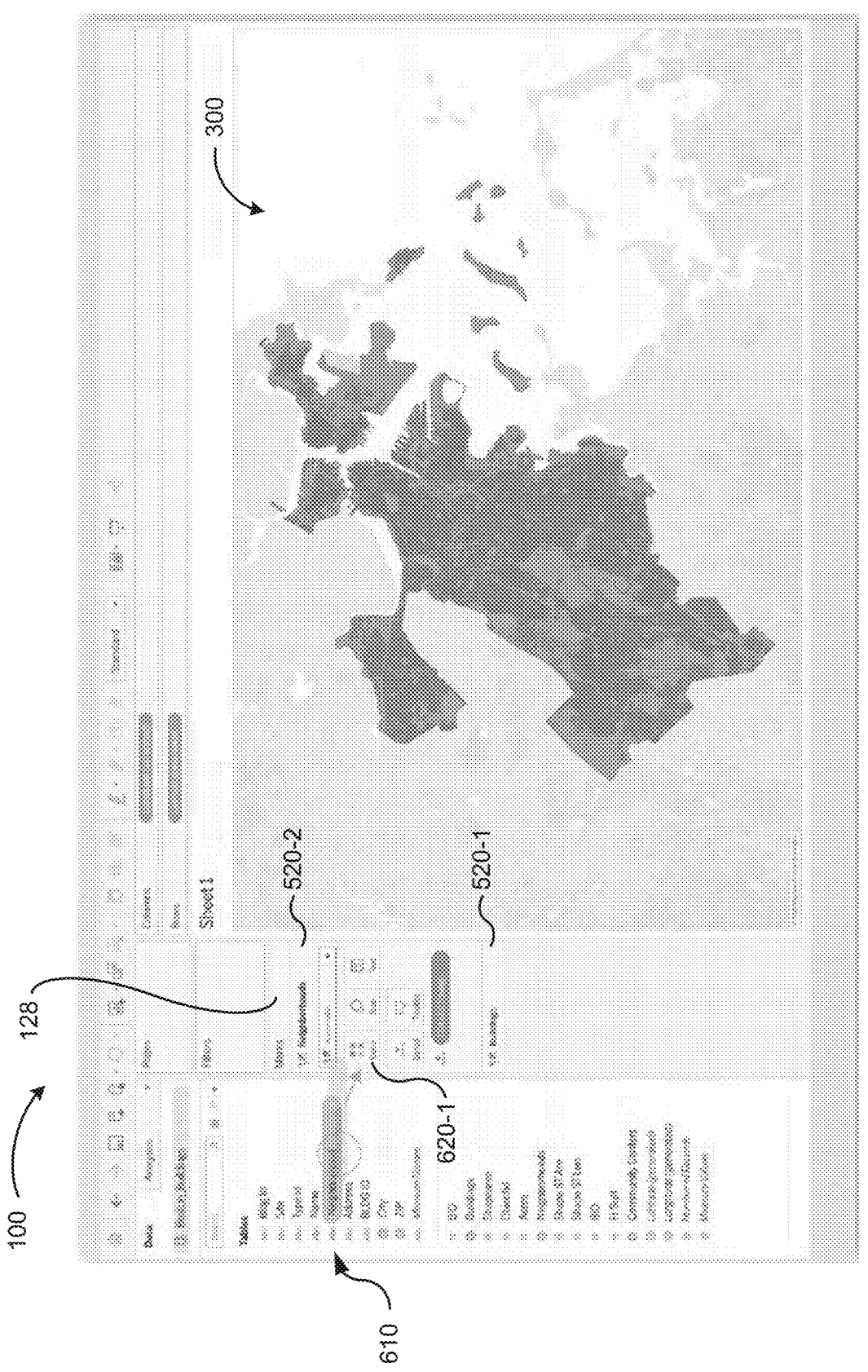
FIGS. 6A-6C illustrate encoding visual variables in a data visualization of a map according to some implementations.
Figure 6B:
Figure 6C:
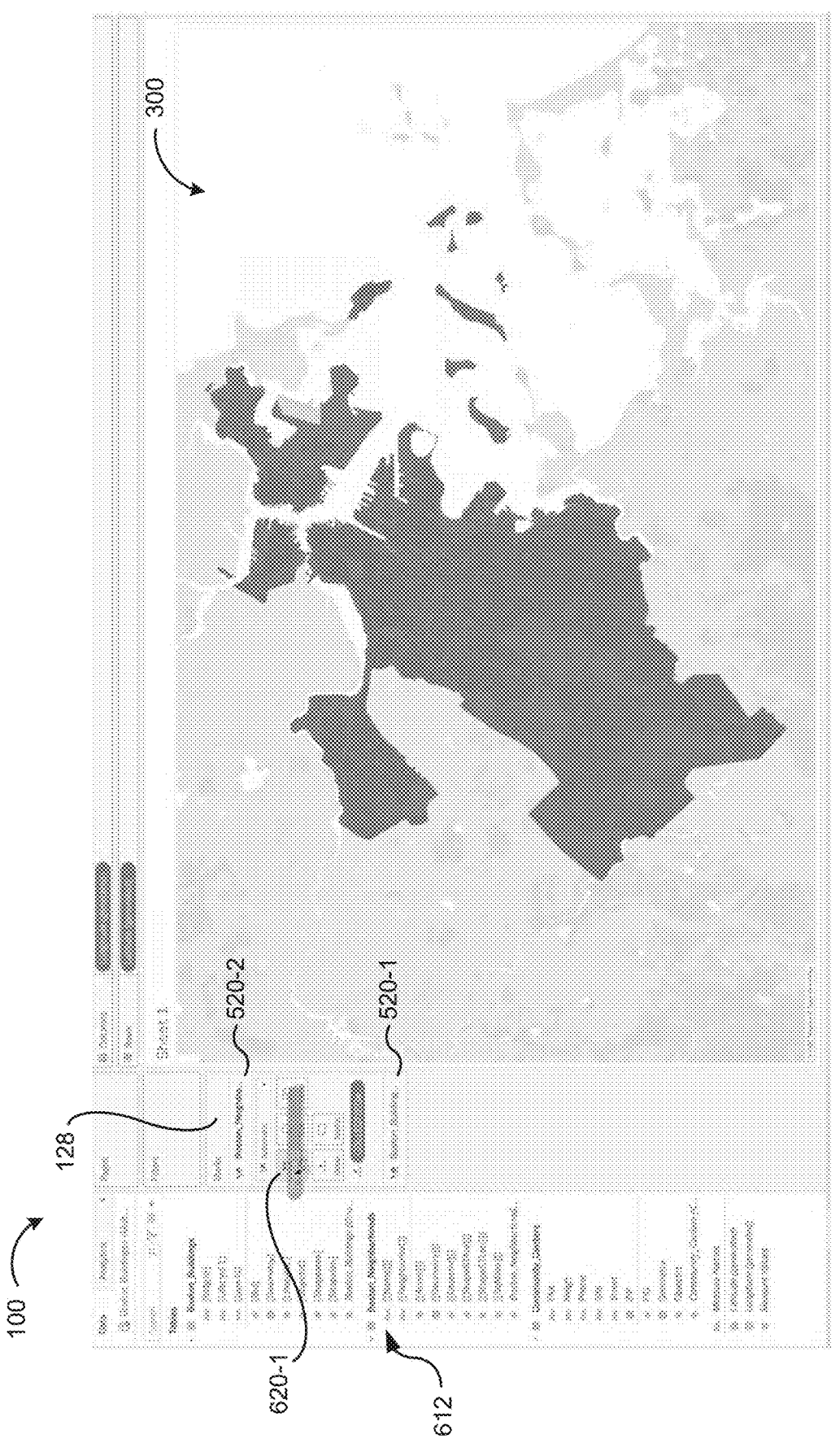

FIGS. 6A-6C illustrate encoding visual variables in a data visualization 300 of a map according to some implementations. In addition to adding new visual marks and/or new layers to a data visualization, a user may also edit (e.g., change or customize) how visual variables of a data visualization are encoded, thereby changing the appearance of visual marks displayed in a data visualization. For example, a user may update the data visualization 300 to include visual marks that are color coded to convey information regarding the different neighborhoods in Boston, or update the data visualization 300 to include labels (e.g., names) for different neighborhoods in Boston.

FIG. 6A illustrates user selection to edit how a visual variable associated with the "Neighborhoods" data table 610 is encoded. In this example, the user has selected the "Neighborhoods" data table 610 and placed the "Neighborhoods" data table 610 at an affordance 620-1 that is associated with the second layer 520-2 (e.g., associated with the "Neighborhoods" data table 610. The data visualization 300 is automatically updated (e.g., independently of additional user input) in response to the user input to encode the data from the "Neighborhoods" data table 610 using color.

FIG. 6B illustrates the updated data visualization 300. In the updated data visualization 300, the second layer 520-2 includes a second set of visual marks (e.g., the visual marks 540-1 and 540-2) that are color coded by neighborhood. In this example, the "Neighborhoods" data table 610 includes information regarding neighborhood areas in Boston and the affordance 620-1 is a color encoding affordance that allows a user to edit the color encoding of visual marks of the second layer as displayed in the data visualization 300. Thus, the data visualization 300 is updated to display information regarding the boundaries and/or locations of neighborhoods in a color-coded manner such that two different neighborhoods as identified in the "Boston Neighborhood" table are represented by different colors, thereby distinguishing two distinct neighborhoods from one another (e.g., a first area 540-1 on the map that corresponds to a first neighborhood is displayed in a first color and a second area 540-2 on the map that corresponds to a second neighborhood that is distinct from the first neighborhood is displayed in a second color that is distinct from the first color). In some implementations, the data visualization 300 is also updated to include a legend 640 that associates the colors of the new layer in the map to neighborhood names. For example, the legend 640 shows that a first color corresponds to the South Boston neighborhood 540-1 and a second color corresponds to the Dorchester neighborhood 540-2.

FIG. 6C illustrates an example of a user selection to specify mark encoding using one or more data fields. In this example, the user has selected a "Name" data field 612 corresponding to a "Names" data field from the "Boston Neighborhoods" data table and placed the "Name" data field 612 at an affordance 620-1 of the second layer 520-2 associated with the second layer. In response to the user input, the color encoding visual variable is associated with the Name data field 612, as shown in FIG. 6B, the data visualization 300 displays neighborhoods that have different names in different colors.

The visual variables specify how data (e.g., geographic data) is displayed in a data visualization (e.g., what visual marks are used and what information the visual marks display). When there are two or more layers, each layer has its own encodings that specify how the marks in that layer are displayed.

FIGS. 7A-7F illustrate editing the appearance of visual marks in a data visualization of a map according to some implementations.

Figure 7A:
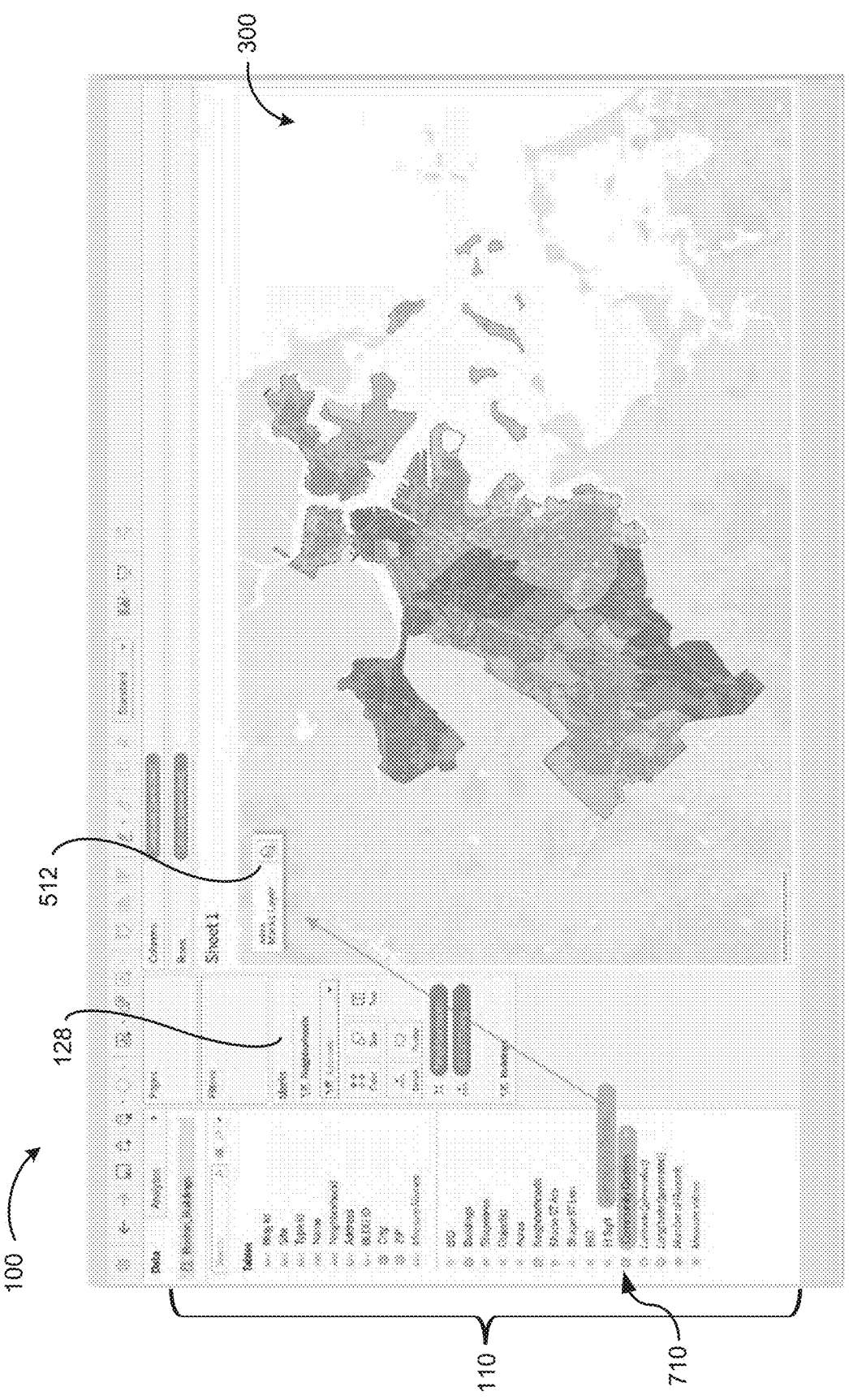
FIGS. 7A-7F illustrate editing the appearance of visual marks a data visualization of a map according to some implementations.

FIG. 7A illustrates adding a third layer to the data visualization 300. In this example, a user drags and drops a "Community Centers" data field 710 at the affordance 512 for adding a new layer. The "Community Centers" data field 710 includes geographic data regarding the location of community centers. In response to the user input, the graphical user interface 100 is updated in accordance with the geographic data from the "Community Centers" data field 710.

Figure 7B:
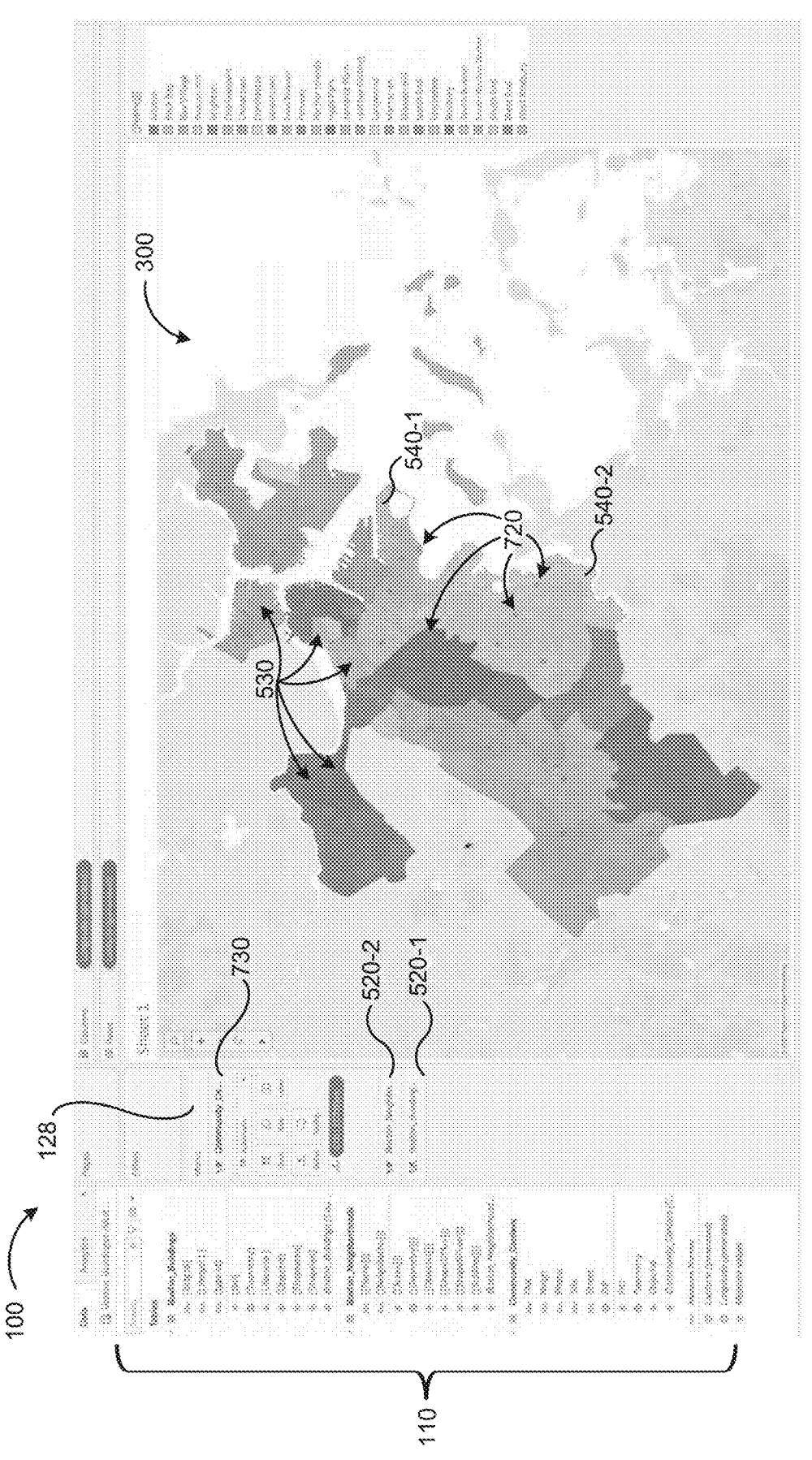

FIG. 7B illustrates the updated graphical user interface 100 in response to receiving the user input to generate (e.g., add) a new layer (e.g., a third layer) using the information stored in the "Community Centers" data field 710. The data visualization 300 is updated to display the community centers (shown as circles 720 on the data visualization 300), and the marks region 128 is updated to include the third layer 730 (e.g., the newly added layer corresponding to the "Community Centers" data field 710).

In some implementations, such as when the data visualization 300 includes a plurality of layers (e.g., map layers), the marks region 128 displays the layers (e.g., the layers 520-1, 520-2, and 730). In some implementations, the map layers are automatically ordered based on the order in which each layer was added to the data visualization. In this example, the first layer is below (e.g., ordered lower) than each of the second and third layers since the first layer was added before each of the second and third layers. Similarly, the third layer is the ordered above the first and second layers since the third layer was added last (e.g., after adding each of the first and second layers). The order of the layers is reflected in both the data visualization 300 and the marks region 128. For example, the data visualization 300 shows the third set of visual marks 720 (e.g., circles 720) as being in front of (or above) the second set of visual marks 540 (e.g., visual marks 540-1 and 540-2), and shows the first set of visual marks 530 as being behind (or below) each of the second set of visual marks 540 and the third set of visual marks 720. In this example, the first set of visual marks 530 are barely visible in the data visualization 300. In the marks region 128, the top layer is displayed at the top of the marks region 128 and the lowest layer (e.g., first layer, base layer) is displayed at the bottom of the marks region 128. In this example, the first layer 520-1 is displayed at the bottom of the marks region 128, the third layer 730 (e.g., layer icon 730) is displayed at the top of the marks region 128, and the second layer 520-2 is displayed at the between the first layer 520-1 and the third layer 730.

Figure 7C:

FIG. 7C illustrates a drop down menu 732 that is part of the third layer 730 associated with the "Community Centers" data field 710. The drop down menu 732 (shown in an expanded view) displays a plurality of options corresponding to how the data from the "Community Centers" data field 710 is encoded and displayed in the data visualization 300. In this example, the default automatic data visualization type is a map and a user selects a "Circle" data visualization type for the third layer (e.g., for the visual marks corresponding to the "Community Centers" data field 710). In response to the user selection, the data visualization 300 displays a third set of visual marks 720 (e.g., the circles 720) that correspond to locations of community centers. The third set of visual marks 720 (e.g., circles 720) correspond to (e.g., are associated with or belong to) the third layer.

The third set of visual marks 720 are distinct from the second set of visual marks 540 (which correspond to neighborhood regions), and the third layer (e.g., the layer corresponding to the third set of visual marks 720 and corresponding to the "Community Centers" data field 710) is distinct from each of the first layer (e.g., the layer corresponding to the first set of visual marks 530 and corresponding to the "Buildings" data field 410) and the second layer (e.g., the layer corresponding to the second set of visual marks 540 (including the visual marks 540-1 and 540-2) and corresponding to the "Neighborhood" data field 412).

Figure 7D:
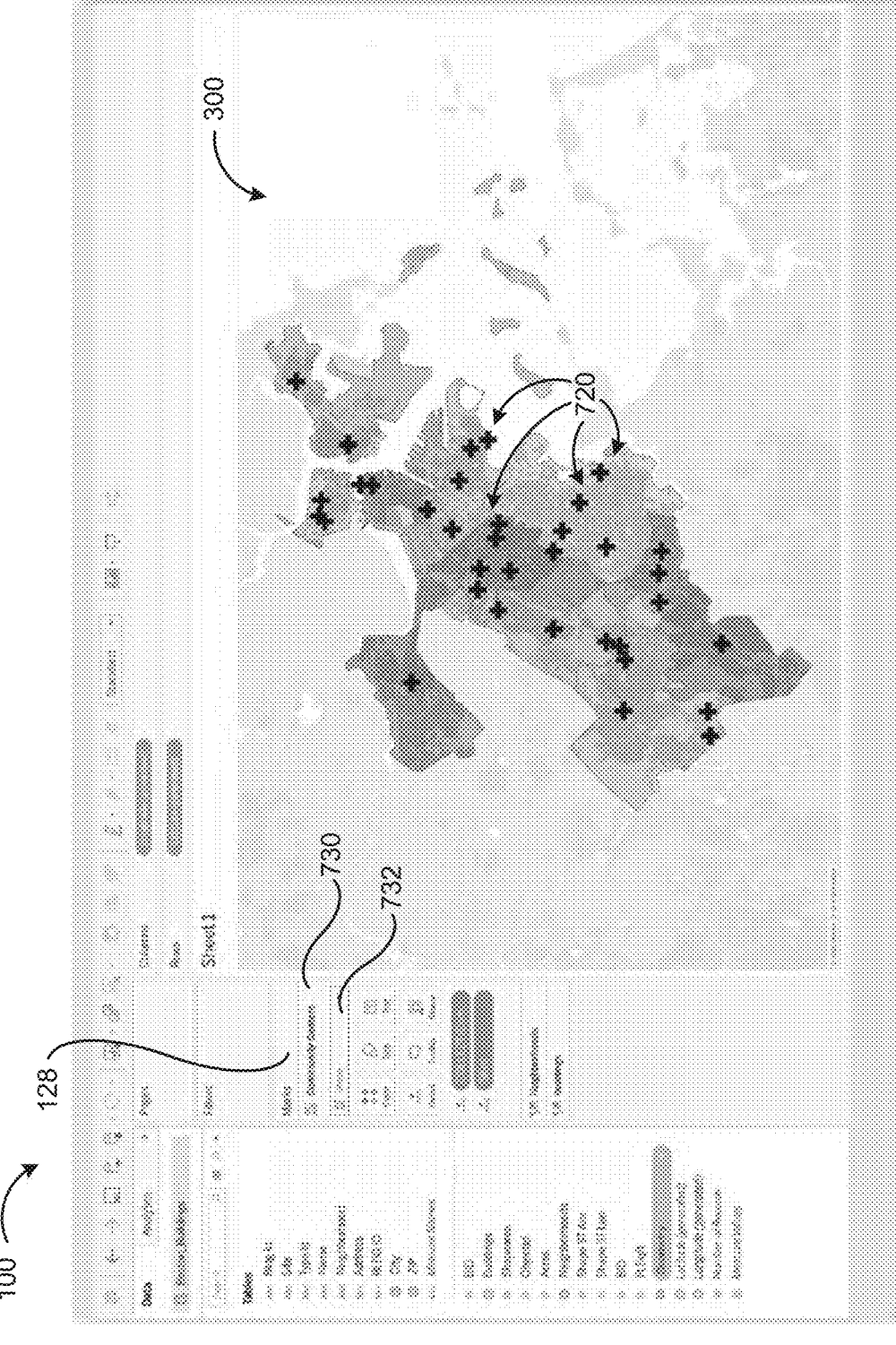

FIG. 7D provides an example where the user has selected "Shape" as the mark type from the drop down menu 732 (shown in a collapsed view). In response to the user selection, the third set of visual marks 720 are displayed as crosses. Although the shape of the visual marks of the third set of visual marks 720 are changed from circles to crosses in response to the user selection of the "Shape" mark type, encoding of the data marks for the first and second layers remains unchanged by the user selection.

Figure 7E:
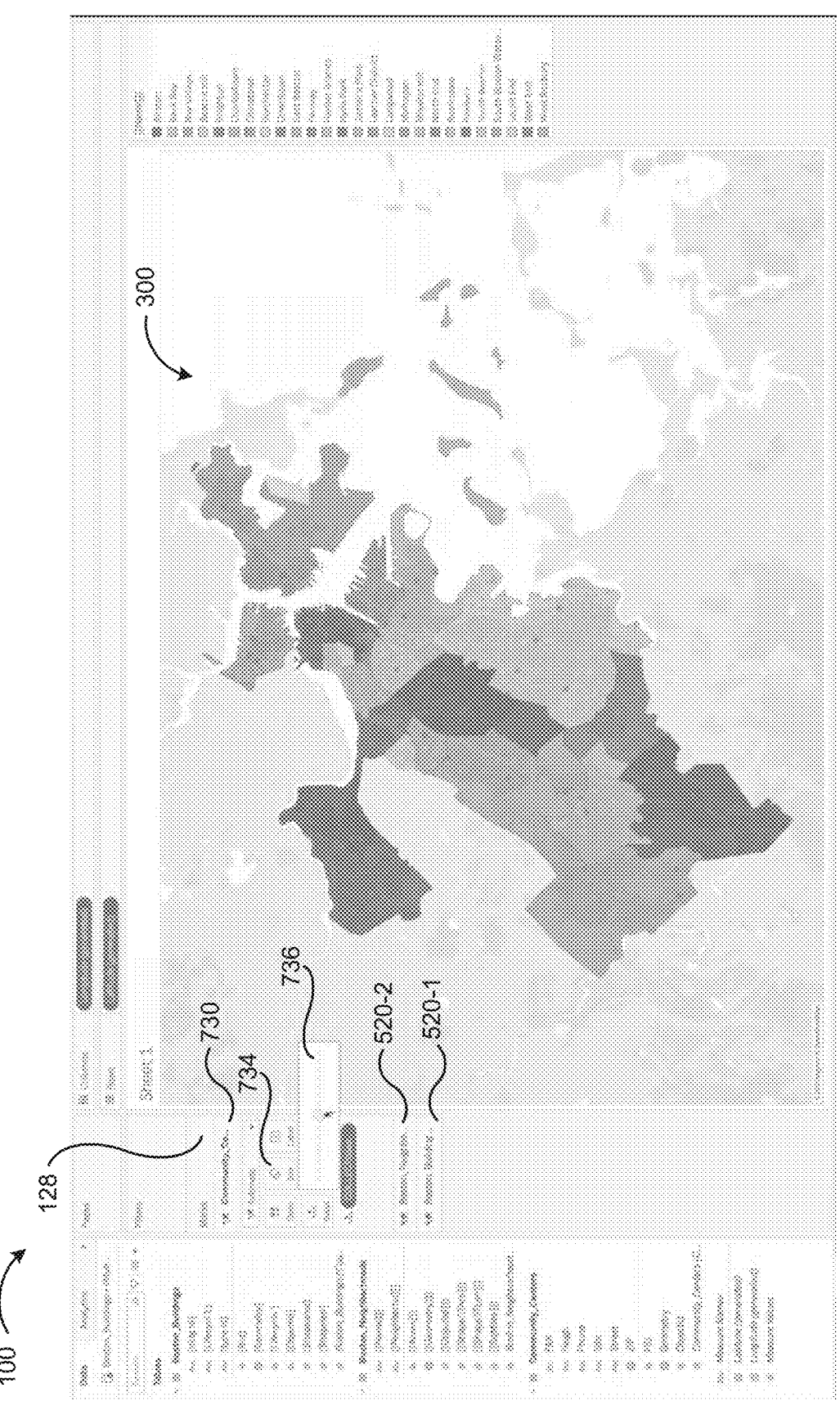

In some implementations, the size and/or color of the visual marks 720 can be edited. FIG. 7E illustrates user input to edit (e.g., change, adjust, select, or set) the size of visual marks in the third set of visual marks 720 in the third layer. In response to the user selection of the size encoding affordance 734, the graphical user interface 100 displays a pop-up window 736, which allows the user to edit the size of the visual marks 720 of the third layer. In response to a user selection to change the size of the visual marks 720, the data visualization 300 is updated to display the visual marks in accordance with the selected size.

Figure 7F:

FIG. 7F illustrates the updated data visualization 300 with an updated size of the visual marks. In this example, the user has selected to increase the size of the visual marks and thus the visual marks 720 of the updated data visualization 300 shown in FIG. 7F are larger than the circles of the data visualization 300 shown in FIG. 7E.

A user can also edit (e.g., change, adjust, select, or set) the color of visual marks in a layer. As shown in FIG. 7F, in response to a user selection of the color encoding affordance 620, the graphical user interface 100 displays a pop-up window 738, which includes a plurality of options (e.g., affordances) for editing the color characteristics of the visual marks 720 in the third layer 730. Using the plurality of affordances in the pop-up window 738, a user may change the color and/or opacity of the visual marks in the corresponding layer as well as add additional visual effects such as a 'Halo' effect or adding a border to the visual marks. In this example, the graphical user interface 100 receives user selection of a color. In response to receiving the user selection of a color, the visual marks in the third layer 730 are updated to the user selected color (e.g., the circles 720 are changed from grey to red).

In some implementations, in response to receiving user input to edit the appearance of visual marks (e.g., size or color), the data visualization 300 updates the appearance of the visual marks in accordance with the user input and encoding of the visual variables associated with the visual marks. This further illustrates that the encoding of marks in the third layer does not affect the encoding of marks in the first and second layers.

FIGS. 8A-8D illustrate editing map layers of a data visualization 300 of a map according to some implementations. As discussed above with respect to FIG. 7B, in some implementations, the marks region 128 displays layers (e.g., the layers 520-1, 520-2, and 730) in an order that reflects the hierarchy of the layers in the data visualization 300. In some implementations, the order of the layers in the data visualization 300 can be rearranged (e.g., edited) by changing the display order of the layers in the marks region 128. For example, if a layer displayed at the bottom of the marks region 128 is moved to the top of the marks region 128, the moved layer is displayed in the data visualization 300 as the top layer (e.g., the highest layer) and visual marks associated with the moved layer are displayed by the data visualization 300 as being in front of (e.g., on top of) visual marks belonging to other layers of the data visualization 300.

Figure 8A:
FIGS. 8A-8D illustrate editing map layers of a data visualization of a map according to some implementations.
Figure 8B:
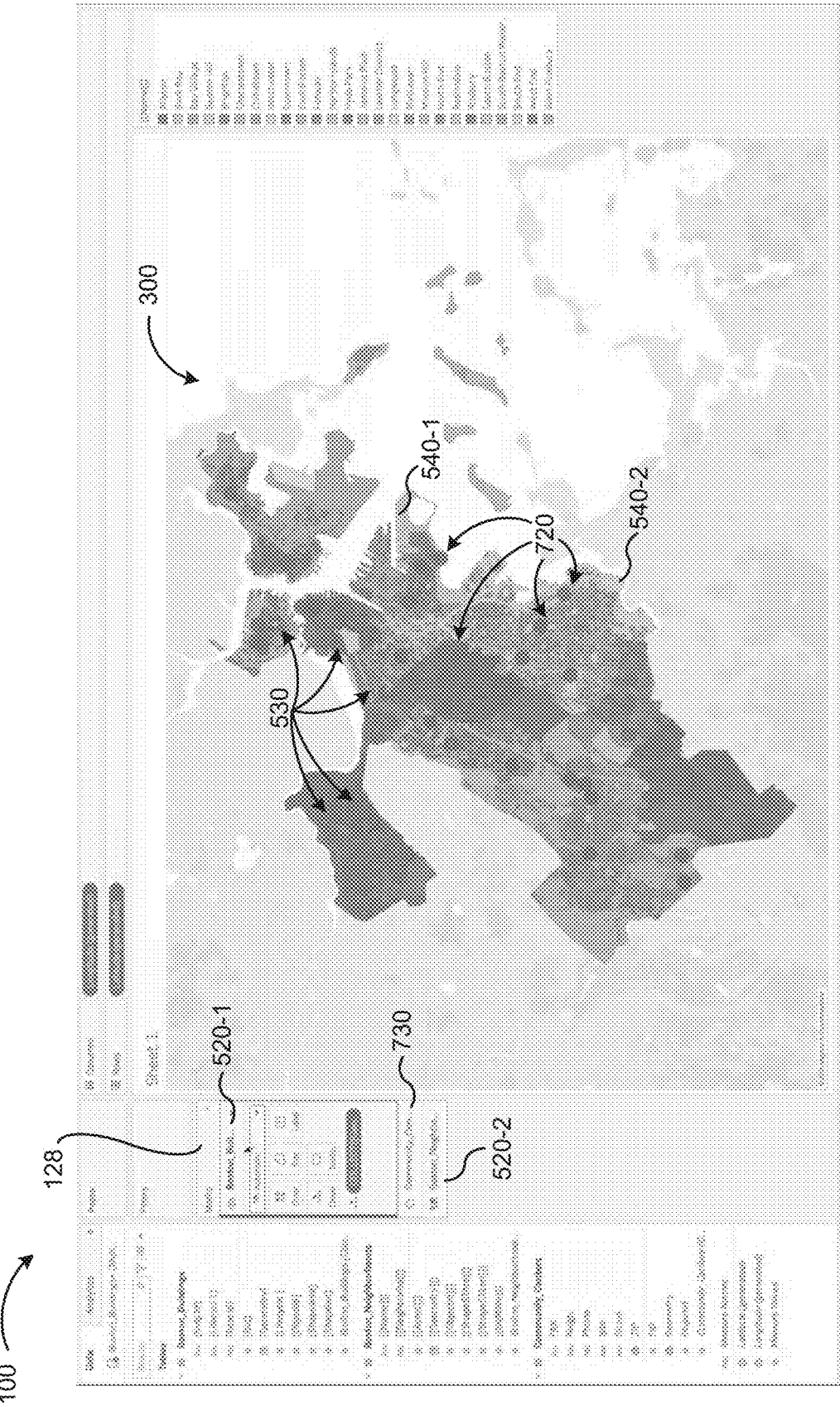

FIGS. 8A and 8B illustrate a drag and drop method of re-ordering layers of a data visualization 300. FIG. 8A shows a user input to drag and drop the first layer 520-1 corresponding the "Boston Buildings" data field 410 in a different location within the marks region 128. In this example, the user places the first layer 520-1 at the top of the marks region 128 such that the first layer 520-1 is now the top layer. The data visualization 300 and marks region 128 are updated to reflect the new order of the layers. As shown in FIG. 8B, the marks region 128 displays the first layer 520-1 at the top, indicating that the first layer 520-1 is the top layer, and the data visualization 300 is updated to show the first set of visual marks 530 in front of (e.g., shown as overlaid on top of) the other visual marks (e.g., the second set of visual marks 540, including the visual marks 540-1 and 540-2, and the third set of visual marks 720) in the data visualization 300.

In some implementations, a user may use a drop down menu of a respective layer to move the layer up or down in the order (e.g., promote or demote the layer).

Figure 8C:
Figure 8D:

FIG. 8C illustrates a user selection to move the first layer 520-1 down by one layer. In response to a user selection of the affordance 812 (e.g., an arrow affordance 812), the graphical user interface 100 displays a drop down menu 814 corresponding to the first layer 520-1. In response to the user selection of the "Move Down" option from the drop down menu 814, the first layer 520-1 is moved down by one layer. FIG. 8D illustrates an updated data visualization 300 based on the demotion of the first layer 520-1.

As shown in FIG. 8D, the marks region 128 is updated to display the first layer 520-1 above the second layer 520-2, indicating that the first layer 520-1 is on top of (e.g., hierarchically above) the second layer 520-2. Additionally, the data visualization 300 has been updated to display the third set of visual marks 720 (e.g., the circles 720 corresponding to locations of community centers) as being overlaid on top of the first set of visual marks 530 (showing blueprints of Boston buildings).

FIG. 8D also illustrates a user selection of the "Move Up" option from the drop down menu 814. In response to receiving the user selection, the graphical user interface 100 updates to move the first layer 520-1 up by one layer (e.g., to the top layer), and the data visualization 300 and the marks region 128 is updated in accordance with promotion of the first layer 520-1 to the top layer.

Figure 9A:
FIGS. 9A-9C illustrate naming map layers of a data visualization of a map according to some implementations.
Figure 9B:
Figure 9C:

FIGS. 9A-9C illustrate naming map layers of a data visualization 300 of a map according to some implementations. The name of a layer in a data visualization 300 can be changed by editing a text field corresponding to the layer. For example, as shown in FIG. 9A, a user can edit a text field 910 corresponding to the name of the Community Centers layer 730. In some implementations, the text field 910 toggles into an editable mode in response to receiving user input at the text field 910 (e.g., a click, a double click, a click and hold, or a right click). Once the text field 910 is in an editable mode, a user may rename the layer 730. As shown in FIG. 9B, the name of the layer 730 is changed from "Community_Centers" to "My Layer."

FIG. 9C illustrates another method of activating the editable mode of the text field 910. In response to receiving a user selection of the affordance 812, the graphical user interface 100 displays drop-down menu 814. In response to receiving user selection of the "Rename" option shown in drop-down menu 814, the text field 910 becomes editable and the user can update or change the name of the layer 730.

Figure 10A:
FIGS. 10A-10C illustrate changing visibility of map layers of a data visualization of a map according to some implementations.
Figure 10B:
Figure 10C:
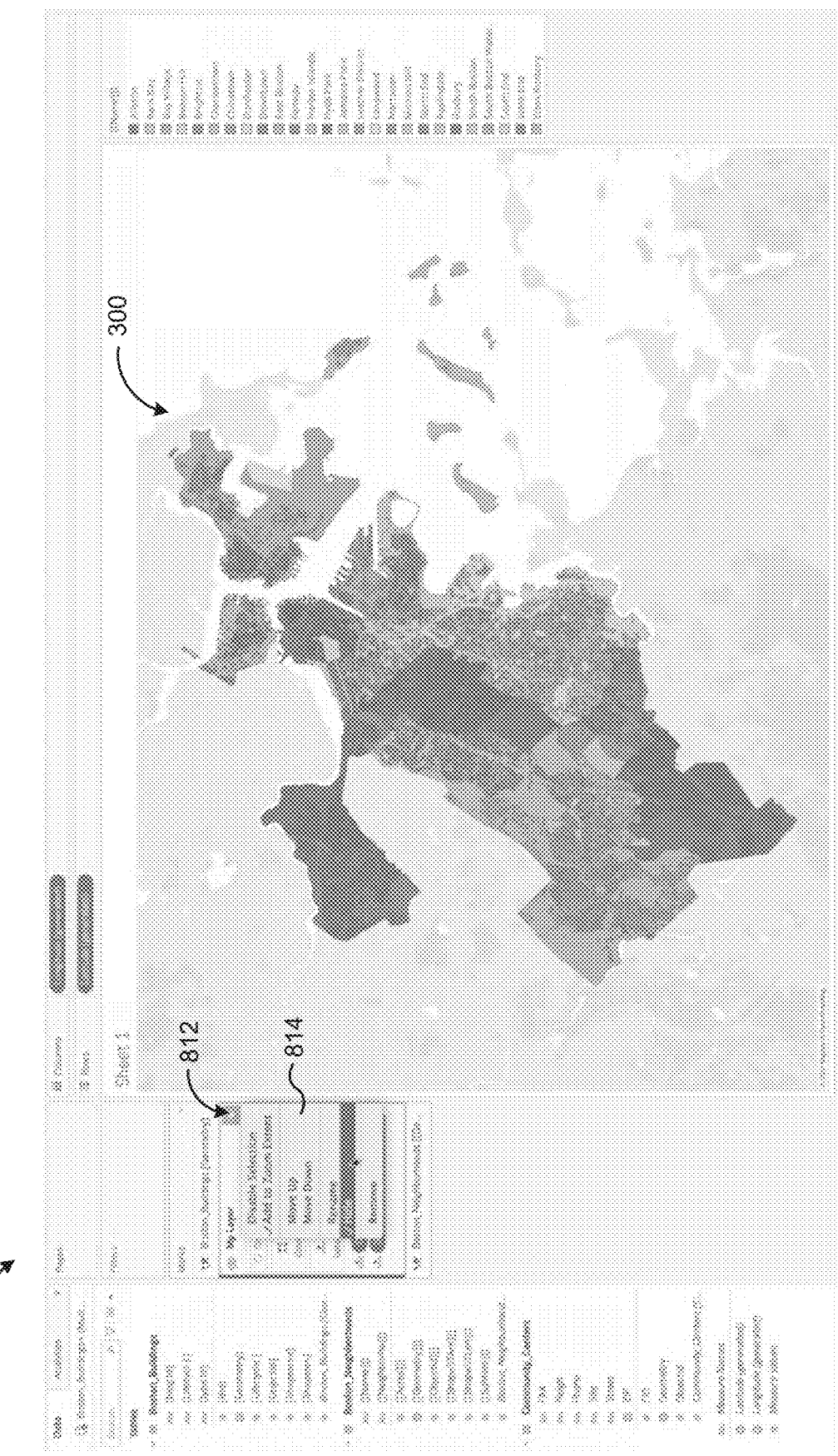

FIGS. 10A-10C illustrate changing visibility of map layers of a data visualization 300 of a map according to some implementations. The visibility of each layer in a data visualization can be individually (e.g., independently) controlled. Control of the visibility of each layer allows a user to decide which visual marks are displayed by the data visualization. For example, a user may generate a comprehensive map data visualization that includes a plurality of layers. However, it may be desirable to display visual marks for a subset, less than all, of the layers at any given time. Thus, a user can edit what information is being displayed in the data visualization by changing the visibility status of each layer in the data visualization without having to remove or add layers to the data visualization each time.

As shown in FIG. 10A, a user may provide a user input at icon 1010 (e.g., a status icon 1010 or a visibility icon 1010) in order to change the status or visibility of the corresponding layer. In this example, a user can select the icon 1010 to change the visibility of the layer 730. For example, in response to receiving a user input (e.g., click) at the icon 1010), the layer 730 is switched from a visible status to a hidden status (e.g., not visible status or invisible status). FIG. 10B illustrates the updated data visualization 300, which shows the first set of visual marks 530 associated with the first layer 520-1 (e.g., visual marks 530 corresponding to Boston buildings) and the second set of visual marks 540 belonging to the second layer 520-2 (e.g., the visual marks 540-1 and 540-2). The updated data visualization 300 does not show the third of visual marks 720 corresponding to the third layer 730 (e.g., visual marks corresponding to locations of community centers) since the third layer 730 is hidden. The icon 1010 is updated in accordance with the hidden status of the third layer 730.

User gestures at the icon 1010 can toggle the visibility of a layer. For example, when the icon 1010 indicates that a respective layer is visible, a user input (e.g., a click or a double click) at the icon 1010 toggles the respective layer associated. A second user input (e.g., a click or a double click) at the icon 1010 while the icon indicates that the respective layer is hidden toggles the respective layer to a visible status.

FIG. 10C shows another method of changing the visibility of a layer. In response to receiving user input at the affordance 812, the graphical user interface 100 displays the drop down menu 814. User selection of the "Hide" option toggles the visibility of the associated layer in the data visualization 300 between being hidden and being visible. While the "Hide" option is displayed with a check mark adjacent to the "Hide" option, the layer is in a hidden status and visual marks corresponding to the layer are not displayed in the data visualization 300. While the "Hide" option is displayed without a check mark adjacent to the "Hide" option, the layer is in a visible status and visual marks corresponding to the layer are displayed in the data visualization 300. Providing a user input (e.g., a selection or a click) at the "Hide" option while the "Hide" option is displayed with a check mark adjacent to the "Hide" option toggles the layer from a hidden status to a visible status. Providing a user input (e.g., a selection, or a click) at the "Hide" option while the "Hide" option is displayed without a check mark adjacent to the "Hide" option toggles the layer from a visible status to a hidden status.

In some implementations, the graphical user interface 100 automatically (e.g., without additional user input, as a default setting) sets each newly added layer to the data visualization 300 in a visible mode. In such cases, in response to receiving a user input to add a layer to the data visualization 300, the newly added layer is added to the visualization 300 in a visible status such that visual marks corresponding to the newly added layer are displayed as part of the data visualization 300 independently of additional user input.

In some implementations, one or more layers can be grouped together such that a single command directed at the group of layers can change the visibility status of all layers. This feature allows a user to group multiple layers to execute a single command (e.g., to change the visibility status to hidden) without having to repeat the command or gesture for each of the layers.

Figure 10D:
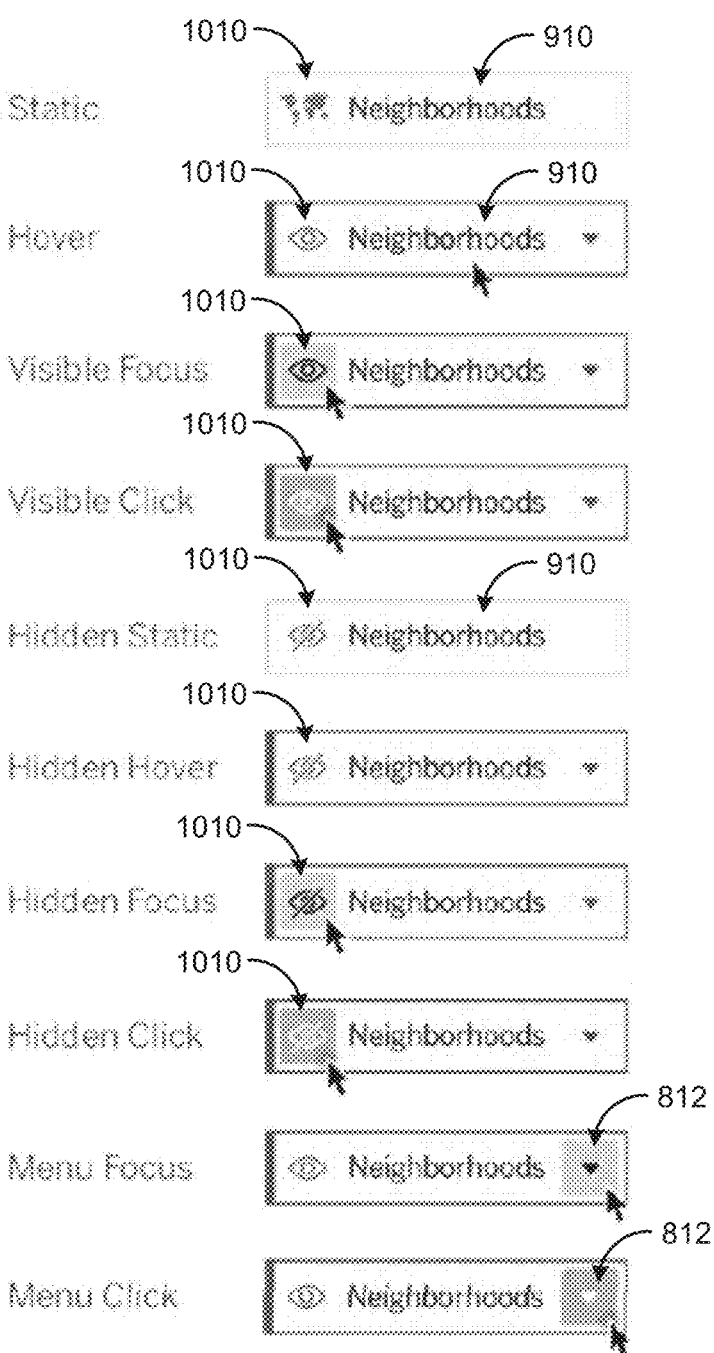
FIG. 10D illustrates how the graphical user interface is updated in response to detecting user gestures in a marks region according to some implementations.

FIG. 10D illustrates how the graphical user interface 100 is updated in response to detecting user gestures in a marks region 128 according to some implementations. FIG. 10D illustrates how the affordances, text fields (such as the text field 910), and icons (such as the icon 1010) associated with a layer respond to user gestures (e.g., a hover, a click, a double click, or a right click).

In the "Static" case, where the layer is in a visible status and a user gesture is not detected in the marks region 128 corresponding to the layer (e.g., no user gesture at the icon 1010, the text field 910, or the affordance 812), the icon 1010 shows an image representative of the type of data visualization of the layer and the text field 910 includes the layer name. In this example, the icon 1010 shows a map, indicating that the corresponding layer is a map layer, and the text field 910 shows that the layer name is "Neighborhoods." In contrast, in the 'Hidden Static' case, the layer is in a hidden status. No user gestures are detected in the portion of the marks region 128 corresponding to the layer (e.g., no detection of user gestures at the icon 1010, the text field 910, or the affordance 812). In this case, the icon 1010 shows an image of an eye with a strikethrough, indicating that the layer is hidden. When a user hovers over the a region in the marks region 128 corresponding to the layer, such as the text field 910, the icon 1010 changes to show an image that represents the visibility status of the layer. The icon 1010 shows an image of an eye when the layer is visible, and the icon 1010 shows an image of an eye with a strikethrough (e.g., a line through the eye) when the layer is hidden. FIG. 10D also illustrates how the icon 1010 is emphasized (e.g., shaded, highlighted) in response to detecting a user hover or a user click at the icon 1010. FIG. 10D also illustrates how the affordance 812 is emphasized (e.g., shaded, highlighted) in response to detecting a user hover or a user click at the affordance 812.

FIGS. 11A-11D illustrate selection of visual marks in a data visualization 300 of a map according to some implementations.

Figure 11A:
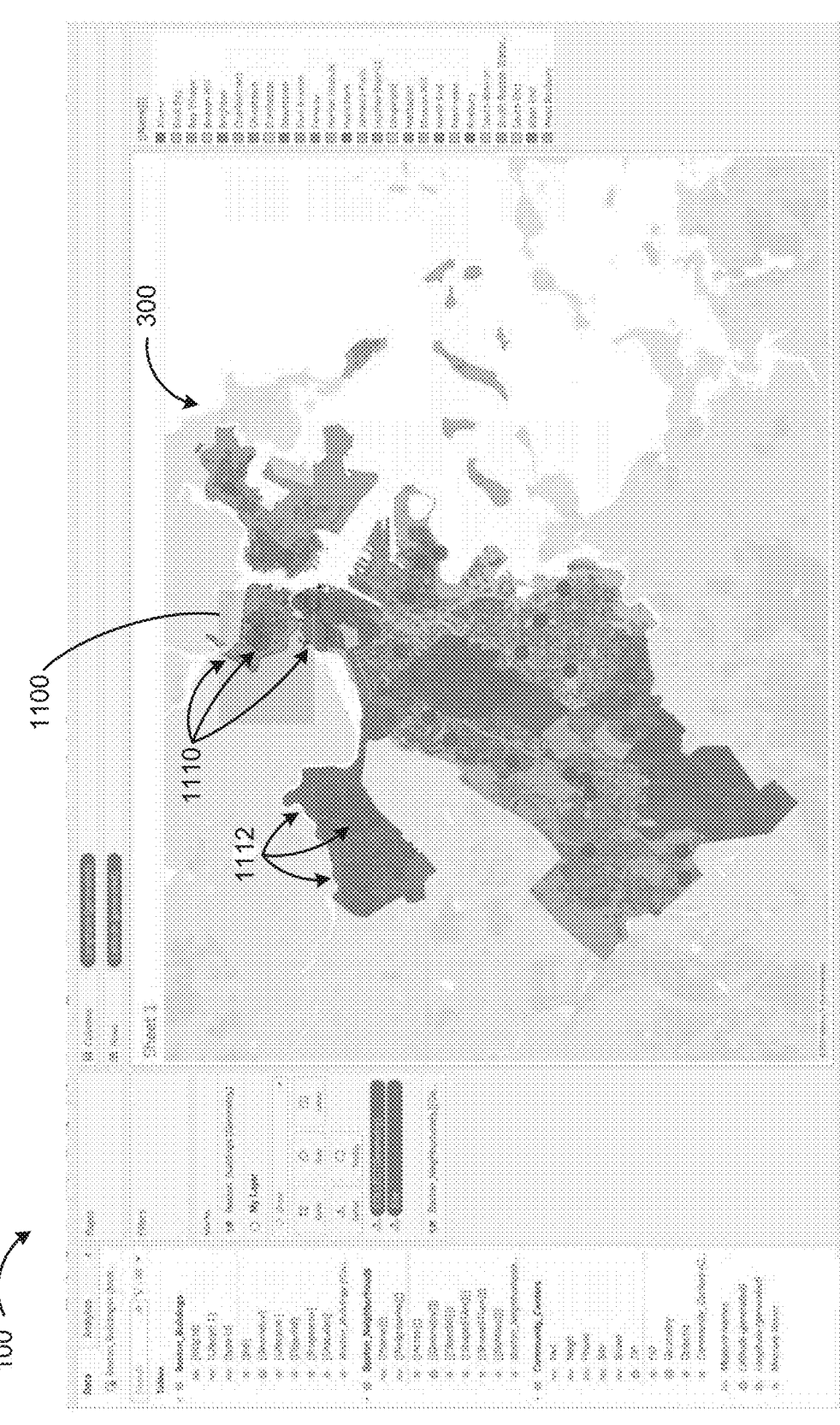
FIGS. 11A-11D illustrate selection of visual marks in a data visualization of a map according to some implementations.

FIG. 11A illustrates user selection of visual marks in the data visualization 300 when all layers (e.g., all map layers) of the data visualization 300 are in a selectable mode (e.g., when selection of visual marks in the layers is enabled). In this example, the visual marks that are included in the user selection (e.g., a box 1100 drawn by the user) are emphasized (e.g., outlines of the visual marks are bolded, the visual marks are bolded) to indicate which visual marks are included in the user selection. For example, the visual marks 1110 that are included in the box 1100 corresponding to the user selection are emphasized relative to visual marks 1112 outside the box 1100 indicating that the emphasized visual marks 1110 are included in the user selection and the visual marks 1112 are not included in the user selection. In this example, all three layers 520-1, 520-2, and 730 of the data visualization 300 are selectable and thus, the visual marks 1110 include the first set of visual marks 530 (showing blueprints of buildings), the second set of visual marks 530 (associated with neighborhood areas), and the third set of visual marks 720 (indicating the location of community centers).

Figure 11B:

FIG. 11B illustrates a method of changing the selection status of a layer. In this example, the graphical user interface 100 displays a drop-down menu 814 corresponding to the third layer 730. The third layer 730 is in a selectable mode (e.g., visual marks can be selected) and thus, the drop-down menu 814 provides an option to "Disable Selection" for the third layer 730. In the case where the third layer 730 is in a non-selectable mode (e.g., visual marks cannot be selected or the visual marks are excluded from user selection and user gestures at the data visualization 300), the drop-down menu 814 provides an option to "Enable Selection" for the third layer 730. In response to receiving a user selection of the "Disable Selection" option, selection of visual marks from the third set of visual marks 720 that belong to the third layer 730 (e.g., "My Layer") is disabled.

Figure 11C:
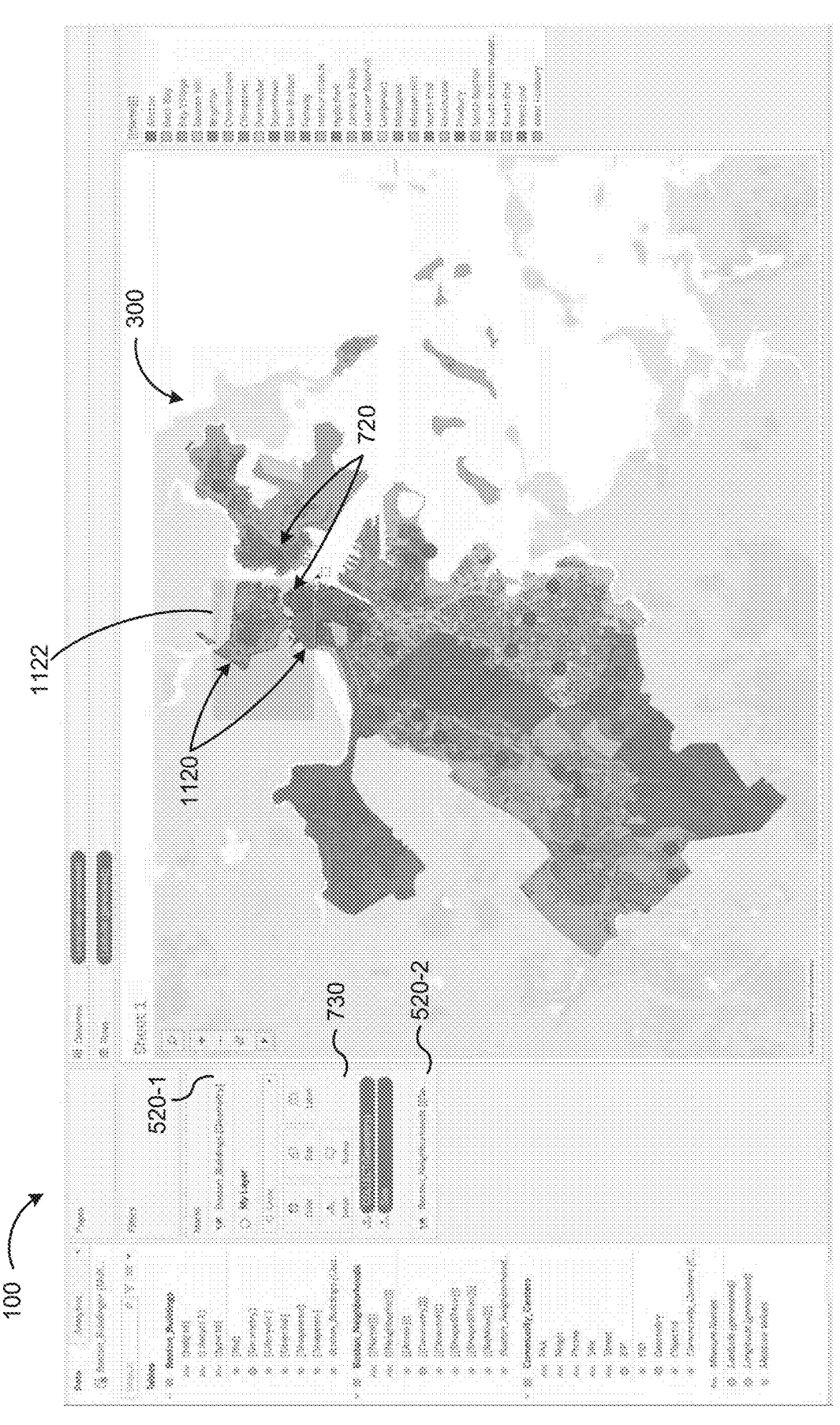

As shown in FIG. 11C, the visual marks 1120 that are emphasized in the data visualization 300 includes visual marks from the second subset of visual marks 540 (e.g., visual marks within the selected region 1122 that correspond neighborhoods). Additionally, visual marks from the third set of visual marks 720 are not emphasized, regardless of whether or not they are inside the user selection (e.g., selected region, selected area, box 1122), indicating that they are not part of the user selection.

Figure 11D:
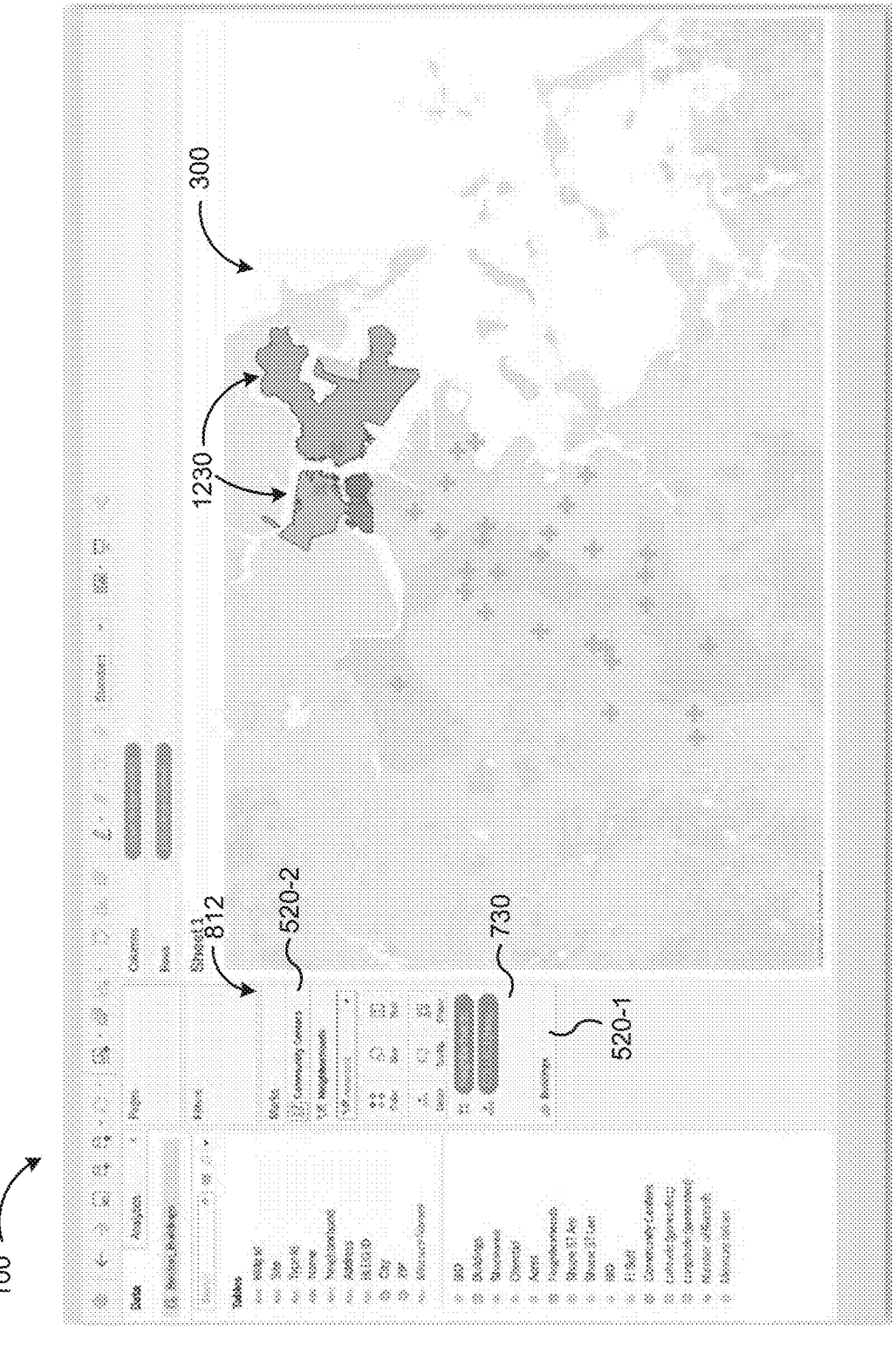

FIG. 11D shows yet another example where the first layer 520-1 and the third layer 730 are disabled for selection. In response to receiving a user input to select visual marks in the data visualization 300, the selected visual marks 1230 include visual marks from the second set of visual marks 540 (associated with the second layer 520-2) and do not include any of the visual marks from the first set of visual marks 530

(corresponding to the first layer 520-1) and do not include any of the visual marks from the third set of visual marks 720 (corresponding to the third layer 730). The selected visual marks 1230 are emphasized relative to visual marks that are not included as part of the selection.

In some implementations, the graphical user interface 100 automatically (e.g., as a default setting, independently of additional user input) sets each newly added layer to the data visualization 300 in a selectable mode. For example, in response to receiving a user input to add a layer to a data visualization, the newly added layer is added to the data visualization in a selectable status such that visual marks corresponding to the newly added layer are selectable by a user input at the data visualization.

Figure 12:
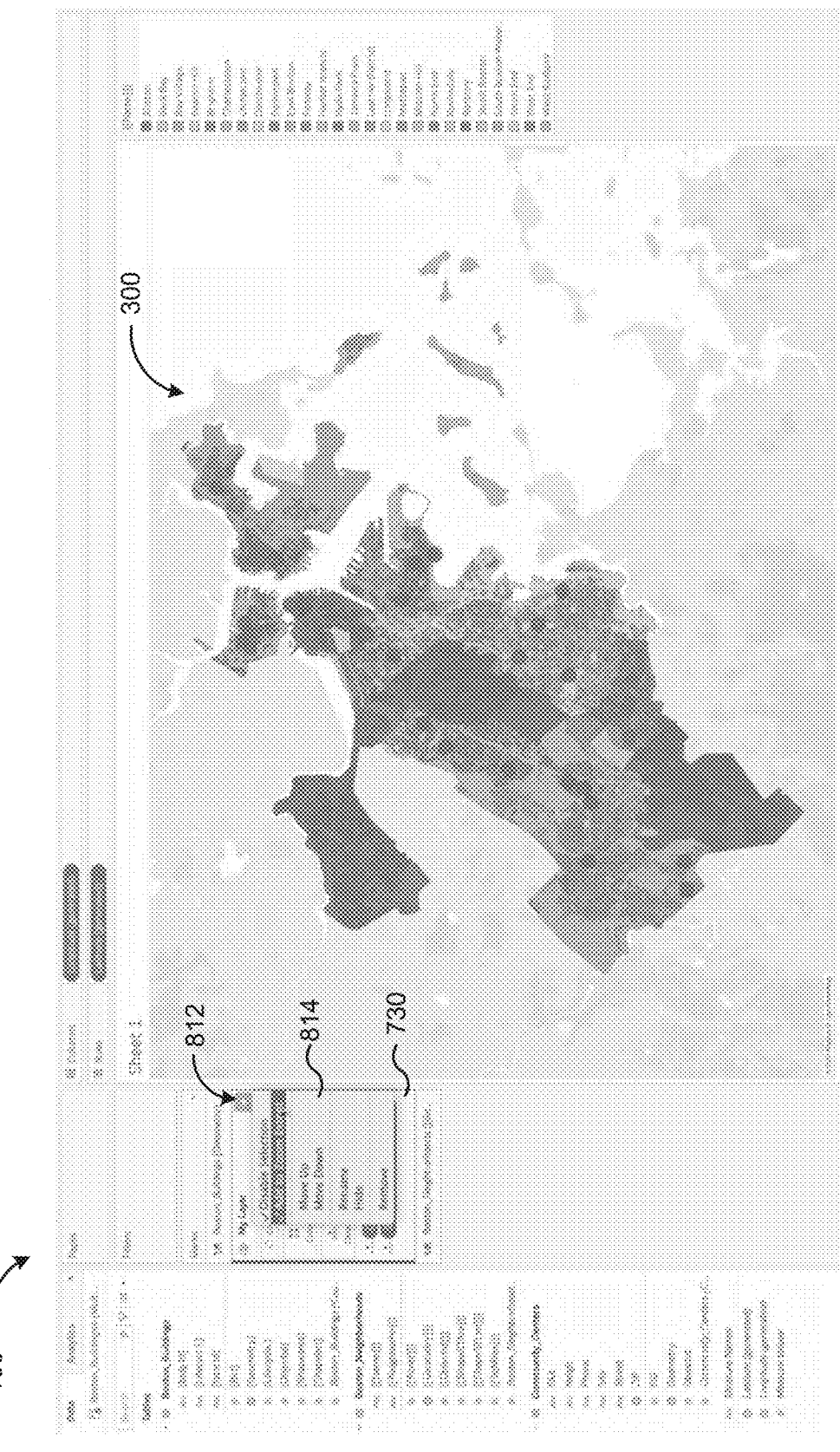
FIG. 12 illustrates zoom extent operation of a data visualization of a map according to some implementations.

FIG. 12 illustrates a zoom extent operation of a data visualization 300 of a map according to some implementations. The zoom extent of a data visualization refers to the default view or a home view. When a data visualization only includes one layer, the zoom extent is a view of the data visualization that includes all visual marks in the one layer. When the data visualization includes a plurality of layers, each of the plurality of layers can be individually added to the zoom extent of the data visualization. In response to adding a layer to the zoom extent of the data visualization, the default view of the data visualization will include all visual marks from the layer. Any layers that are not added to the zoom extent of the data visualization may still be displayed as part of the data visualization (e.g., if the layer is in a visible status) but the default view of the data visualization may not necessarily include all visual marks of a layer that has not been added to the zoom extent of the data visualization.

As shown in FIG. 12, in response to receiving user selection of the "Add to Zoom Extent" option provided in a drop-down menu 814 corresponding to the third layer 730, the data visualization 300 automatically updates the default view of the data visualization 300 so that all visual marks that are part of the third layer 730 are visible when the data visualization 300 is in a default view or home view. A user may zoom (in or out) to update how much of the data visualization 300 is displayed and which visual marks are visible in the data visualization 300 at any given time while maintaining the zoom extent of the default view or home view of the data visualization 300. Thus, regardless of any user actions to adjust the view of the displayed data visualization 300 (e.g., zoom in, zoom out, or scroll), the default view or home view of the data visualization 300 includes all visual marks from layers that are included as part of the zoom extent of the data visualization 300.

Figure 13:
FIG. 13 illustrates displaying information regarding visual marks in a data visualization of a map according to some implementations.

FIG. 13 illustrates displaying information regarding visual marks in a data visualization 300 of a map according to some implementations. In some implementations, in response to a user gesture at visual mark in the data visualization 300, such as a click or hover over a visual mark, the data visualization 300 displays information regarding the visual mark. In this example, a user hovers over a visual mark 1300 corresponding to Boston neighborhood. In response to detecting the user gesture (in this example, a hover) the data visualization 300 displays a box 1310 (e.g., a pop-up region or a floating window), which includes a label for the visual mark 1300. In this example, the box 1310 displays the name of the Boston neighborhood corresponding to the visual mark, namely "Brighton."

Figure 14A:
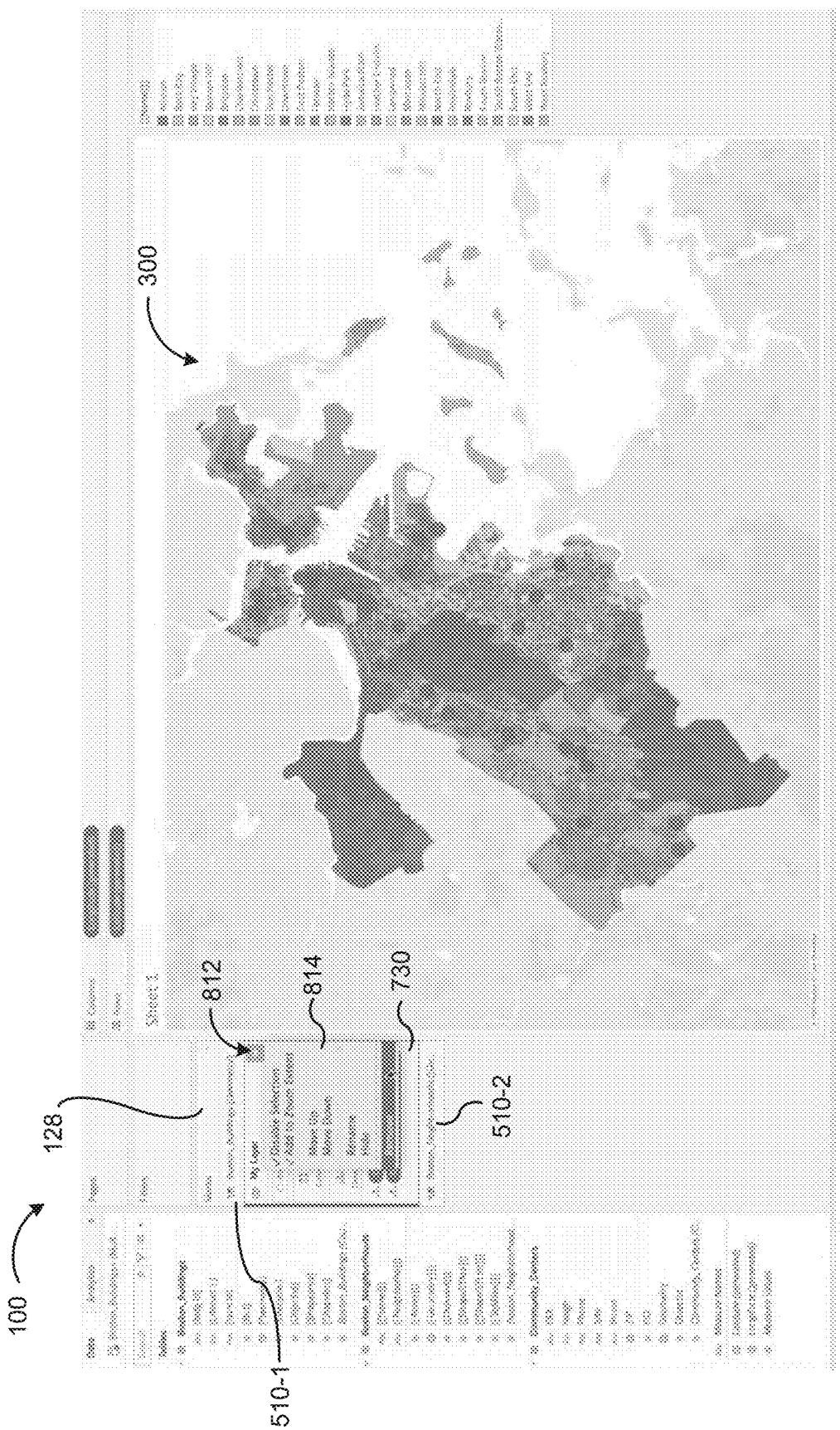
FIGS. 14A-14D illustrate removing map layers from a data visualization of a map according to some implementations.
Figure 14B:
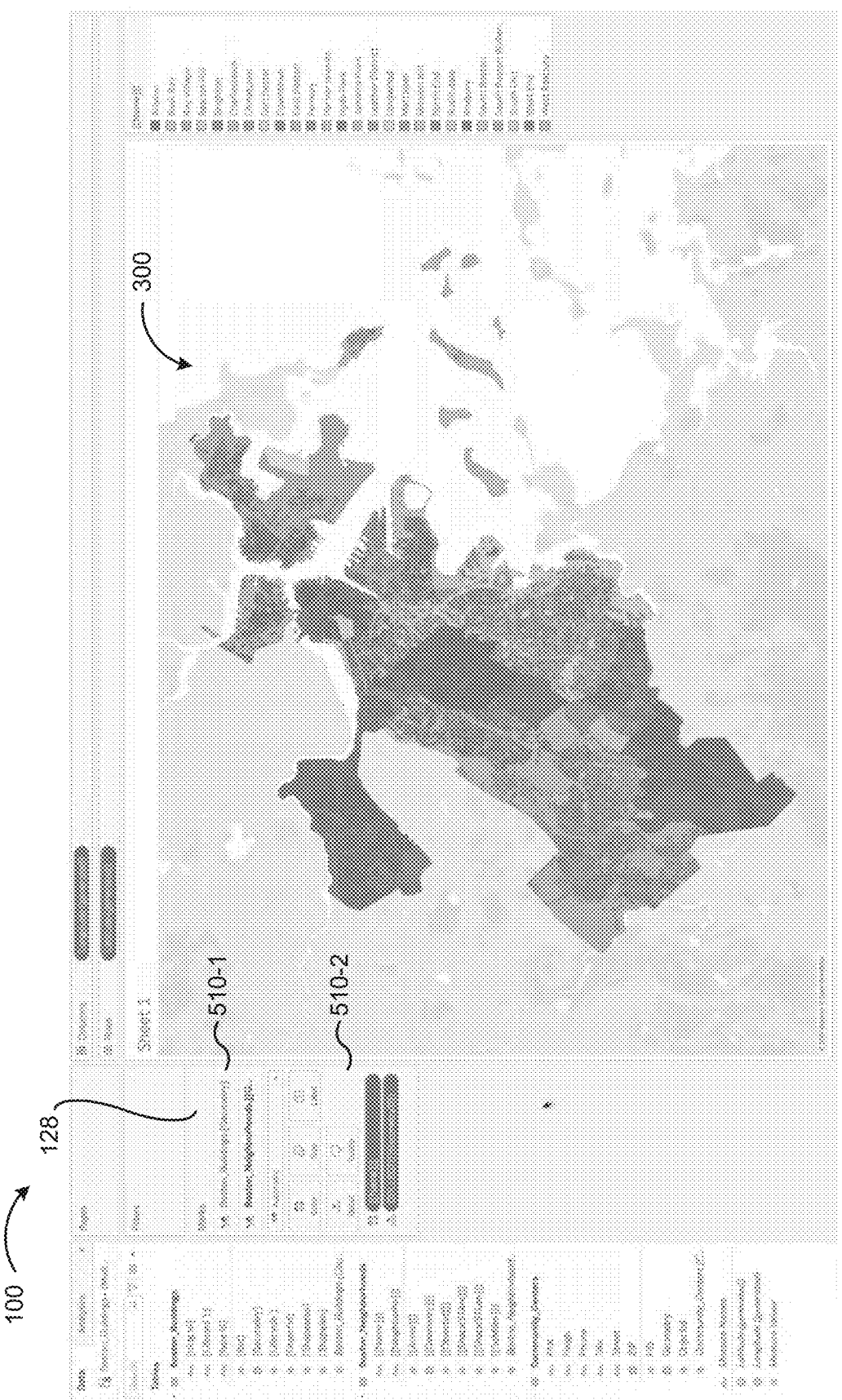

FIGS. 14A-14D illustrate removing map layers from a data visualization of a map according to some implementations. Each of the layers of the data visualization 300 can be removed from the data visualization 300. For example, as shown in FIG. 14A, the third layer 730 is removed by selecting the "Remove" option from a drop-down menu 814 associated with the third layer 730. In response to a user selection of the "Remove" option, the third layer 730 is removed from the data visualization 300. As shown in FIG. 14B, visual marks from the third set of visual marks 720 that correspond to locations of community centers are no longer displayed as part of the data visualization 300. Additionally, the marks region 128 is updated to show only the first layer 520-1 the second layer 520-2. The marks region 128 does not include the third layer 730 once the third layer 730 is removed from the data visualization 300.

Figure 14C:
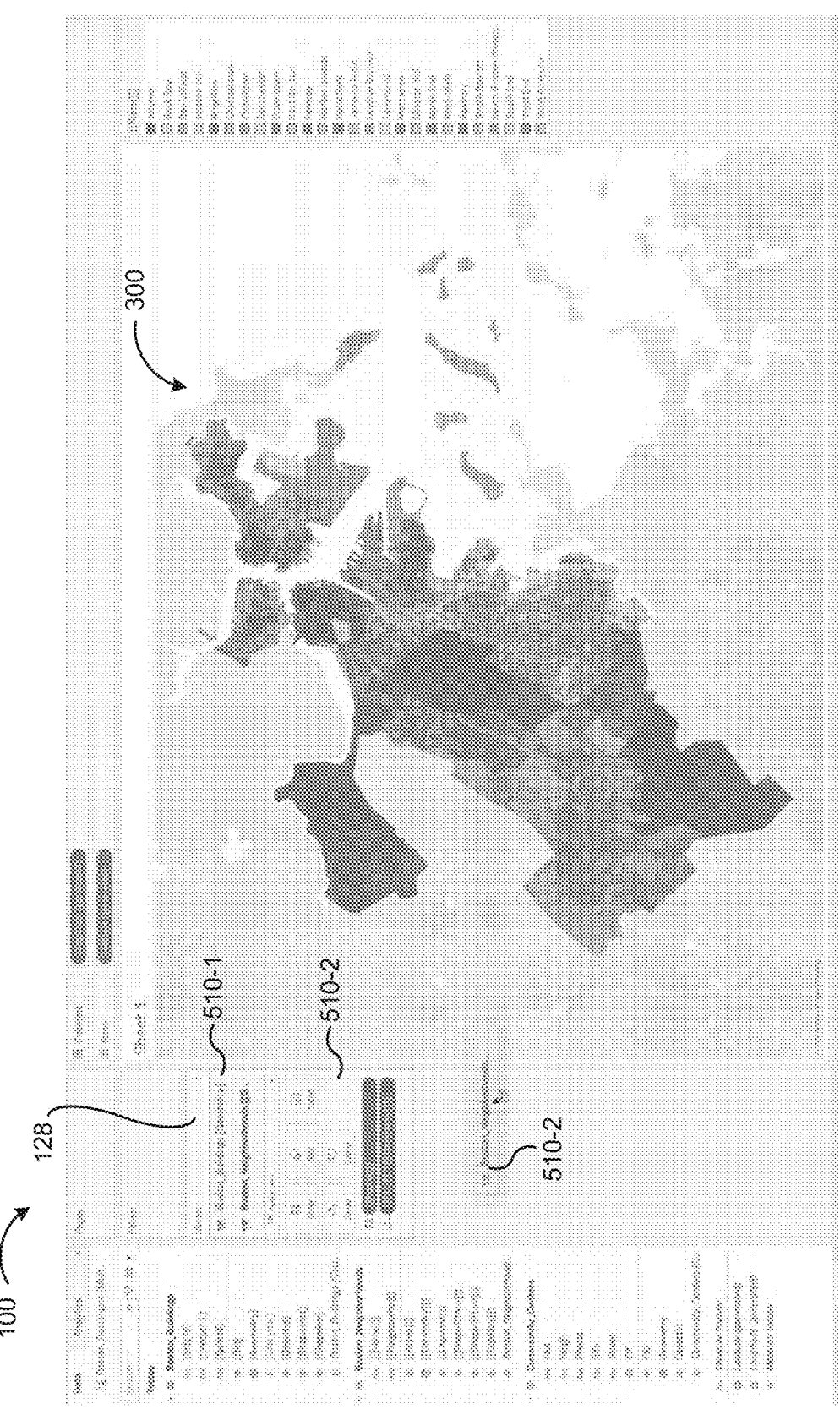

FIG. 14C illustrates another method of removing a layer from a data visualization. In some implementations, a user may select a layer from the marks region 128 and place (e.g., drag and drop) the layer in an area of the graphical user interface 100 that is outside of (e.g., different from) the marks region 128. In this example, the user is dragging the second layer 510-2 to a region of the graphical user interface 100 that is distinct (e.g., different) from the marks region 128. In response to the user input (e.g., a user action or a user gesture), the second layer 510-2 is removed from the data visualization 300. As show in FIG. 14D, visual marks from the second set of visual marks 540 corresponding to Boston neighborhoods are no longer displayed as part of the data visualization 300. Additionally, the marks region 128 is updated to display affordances associated with the first layer 520-1. The marks region 128 does not include (e.g., does not display) the second layer 520-2 once the second layer 520-2 is removed from the data visualization 300.

Figure 14D:
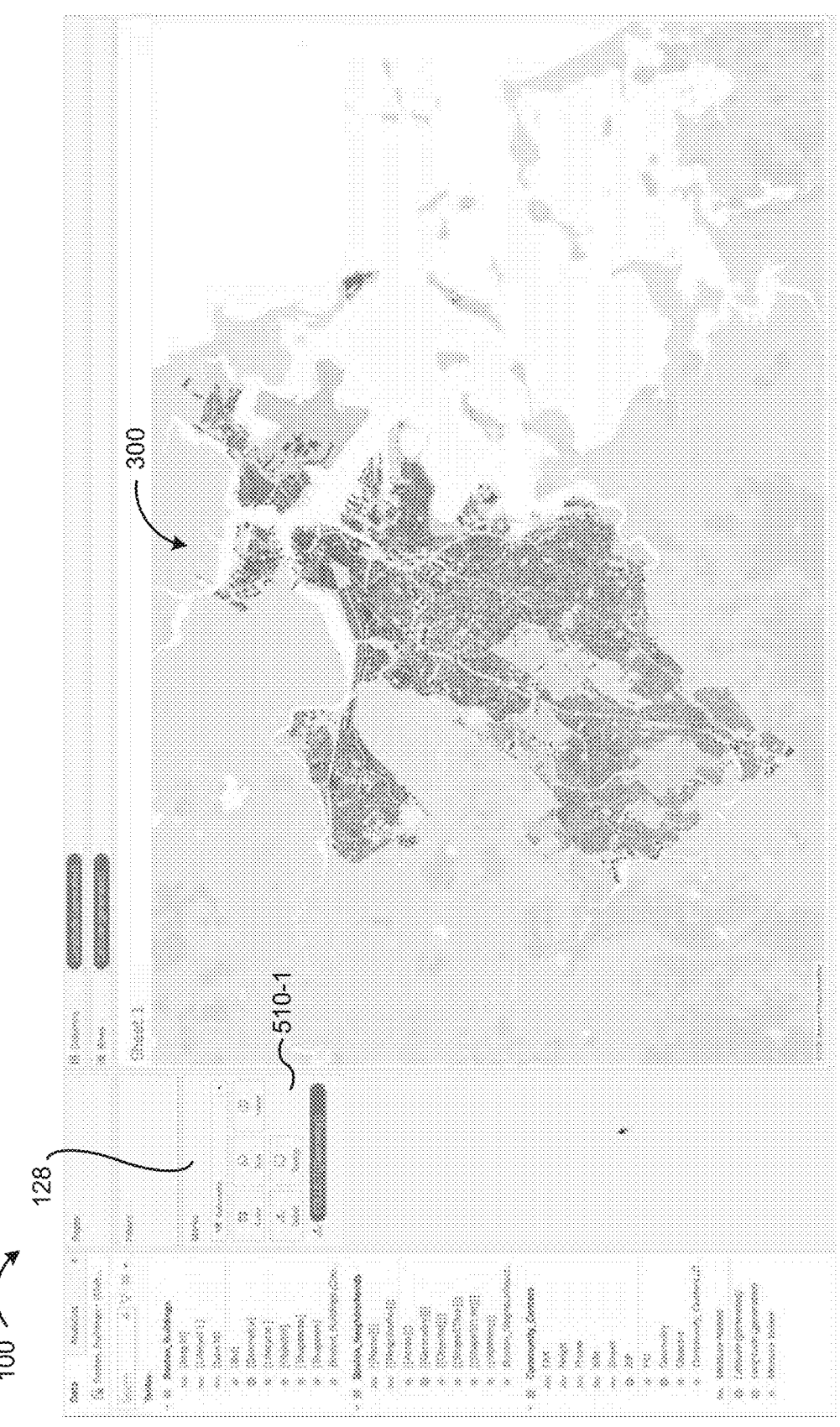

As shown in FIG. 14D, in some implementations, such as when the data visualization 300 includes only one layer, the marks region 128 does not display the name of layer and displays information associated with the layer in an expanded view, including displaying one or more affordances corresponding to the layer.

Figure 15A:
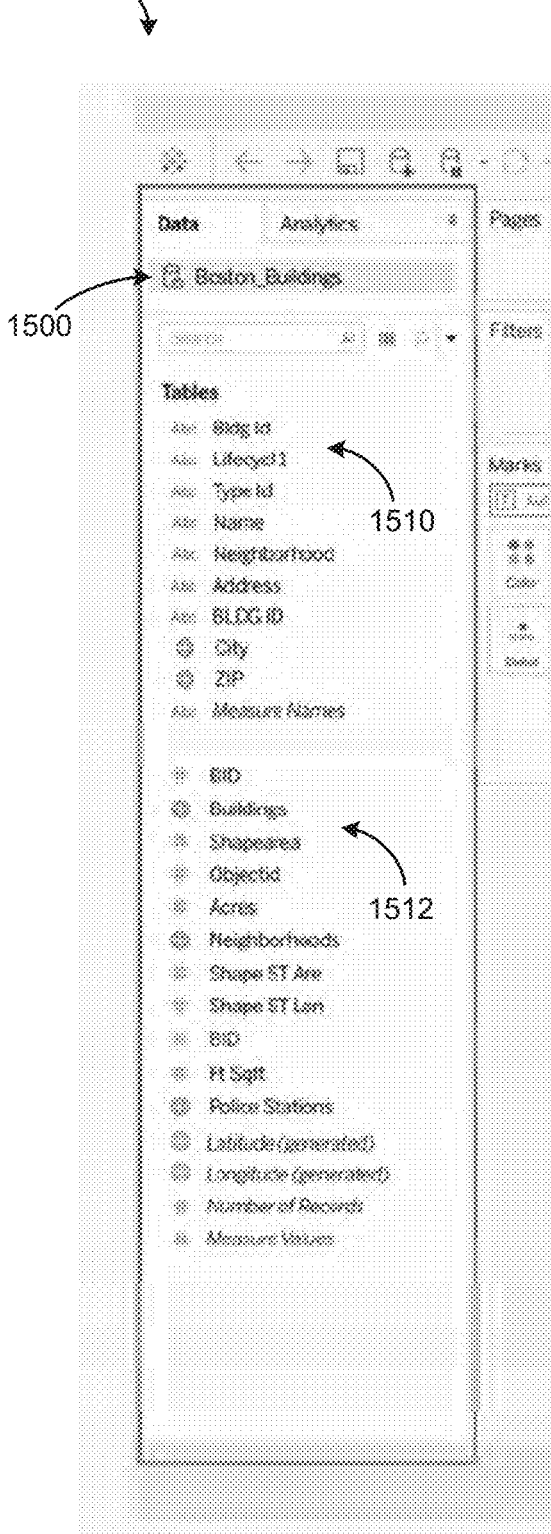
FIG. 15A illustrates examples of a schema information region in a graphical user interface for a single data source according to some implementations.

FIG. 15A illustrates examples of a schema information region 110 in a graphical user interface 100 for a single data source according to some implementations. When a single data source is loaded and displayed as part of the graphical user interface 100, the schema information region 110 displays a name 1500 of the data source as well as icons 1510 corresponding to tables from the data source and icons 1512 corresponding to data fields from the data source.

FIGS. 15B-15D provide examples of a schema information region 110 in a graphical user interface 100 for multiple data sources according to some implementations. When a plurality of data sources are loaded and displayed as part of the graphical user interface 100, the schema information region 110 displays the names 1500 of the data sources (e.g., "Boston_Buildings," "Boston_Neighborhoods," and "Boson_Police_Stations"). The schema information region 110 is also updated in accordance with (e.g., based on) which of the plurality of data sources are selected. In some implementations, the selected data source or the active data source is emphasized (e.g., highlighted, shaded, or bolded) relative to the other data sources in the plurality of data sources. For example, when the "Boston_Buildings" data source is selected, the schema information region 110 displays data tables 1510 (e.g., the data table icons 1510) from the "Boston_Buildings" data source, and the schema information region 110 displays data fields 1512 from the "Boston_Buildings" data source. In FIG. 15C, in response to detecting user selection of another data source (e.g., the "Boston_Neighborhoods" data source), the schema information region 110 displays tables 1520 from the selected data source (e.g., the active data source, which is the "Boston_Neighborhoods" data source), and the schema information region 110 displays data fields 1522 from the selected data source. In FIG. 15D, in response to detecting user selection of another data source (e.g., the "Boston_Police_Stations" data source), the schema information region 110 displays tables 1530 from the selected data source (e.g., the active data source, which the "Boston_Police_Stations" data source), and the schema information region 110 displays data fields 1532 from the selected data source.

Figure 16A:
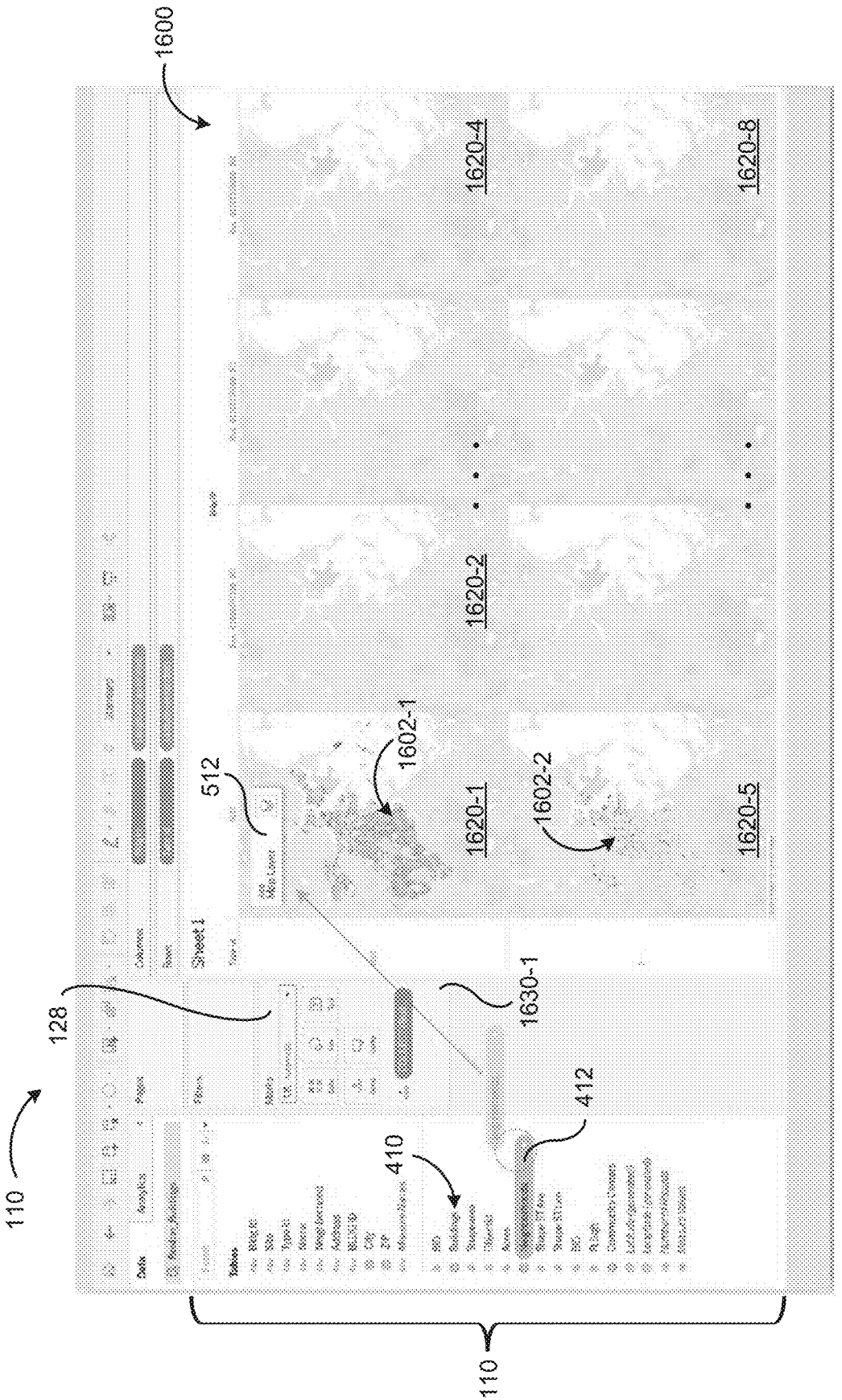
FIGS. 16A-16B illustrate a multi-pane data visualization of a plurality of map layers according to some implementations.
Figure 16B:
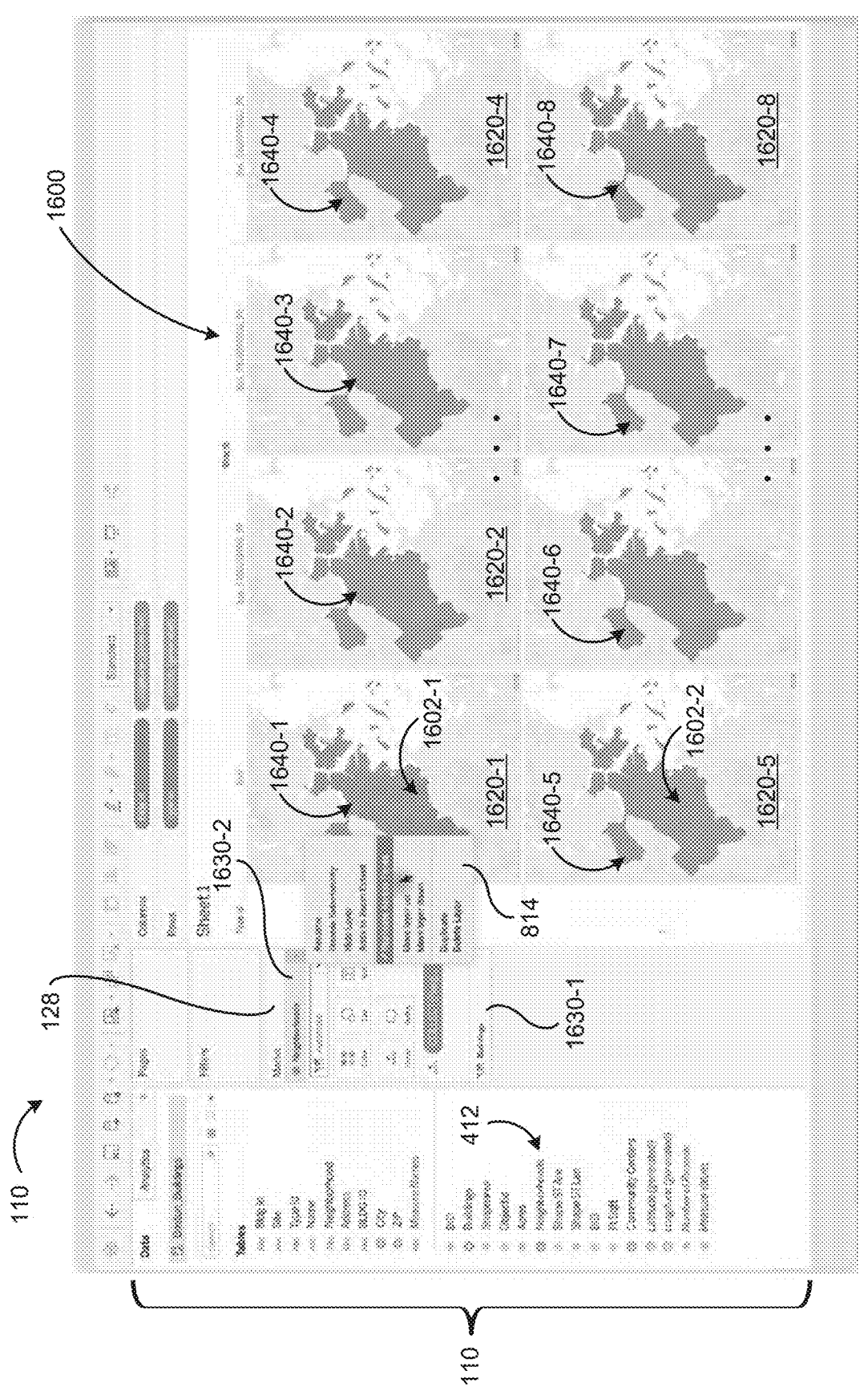

FIGS. 16A-16B illustrate a multi-pane data visualization 1600 of a plurality of map layers according to some implementations. In some implementations, it may be desirable to present information from each layer in a separate pane. FIG. 16A illustrates a data visualization 1600 that includes a plurality of panes 1620 (e.g., panes 1620-1 to 1620-8). A user may add information from a data table or data field to the data visualization 1600. For example, a pane 1620-1 of the data visualization 1600 shown in FIG. 16A displays information corresponding to Boston buildings.

Referring to FIG. 16A, the data visualization 1600 is a multi-pane data visualization that includes a layer corresponding to the "Buildings" data field 410. A set of visual marks that belong to the layer are displayed in at least one of the panes. In this example, a set of visual marks 1602-1 is displayed in a first pane 1620-1 and another set of visual marks 1602-2, which is also included as part of the layer, is displayed in another pane 1620-5. Both sets of visual marks 1602-1 and 1602-2 belong to the same layer and display information regarding buildings.

FIG. 16A also illustrates a user input to add a new layer to the data visualization 1600. The graphical user interface 100 detects (e.g., receives) user selection of the "Neighborhoods" data field 412 from the schema information region 110 and user placement of the "Neighborhoods" data field 412 at the affordance 512. In some implementations, the visual marks in a first pane are different from visual marks in another pane. For example, the visual marks 1602-1 in the first pane 1620-1 are different from the visual marks 1602-2 displayed in the fifth pane 1620-5. In this example, the visual marks 1602-2 displayed in the fifth pane 1620-5 include a subset, less than all, of the visual marks 1602-1 displayed in the first pane 1620-1

Referring to FIG. 16B, in response to the receiving the user input (e.g., user selection and placement), the data visualization 1600 is updated to display information from the "Neighborhoods" data field 412 in at least one of the panes 1620. The marks region 128 is also updated to display a "Neighborhoods" layer 1630.

In some implementations, visual marks corresponding to a single layer can be displayed across multiple panes. FIG. 16B illustrates an example where the user has selected a "Replicate Across Panes" option from a drop-down menu 814 associated with the layer 1630-2. In response to the user's input (e.g., the user's selection of the "Replicate Across Panes" option), the data visualization 1600 populates each of the panes 1620 with visual marks corresponding to the data field associated with the layer 1630-2. In this example, the layer 1630-2 includes visual marks that correspond to geographic data from the "Neighborhoods" data field 412. Thus, each of the panes 1620 of the data visualization 1600 include visual marks (e.g., visual marks 1640-1 through 1640-8) corresponding to neighborhoods in Boston. A user can customize each of the panes 1620 in the data visualization 1600 so that a first pane (e.g., the pane 1620-1) of the data visualization 1600 displays visual marks that differ from visual marks of another pane (e.g., the pane 1620-2). For example, the first pane 1620-1 includes the visual marks 1602-1 that belong to the layer 1630-1 and visual marks 1640-1 that belong to the layer 1630-2. In contrast, a second pane 1620-2 includes visual marks 1640-2 that belong to the layer 1630-2 and does not include visual marks associated with the first layer 1630-1.

FIGS. 17A-17G is a flow chart of a method 1700 of generating map data visualizations (e.g., the data visualizations 300 and 1600) of a map according to some implementations. The method 1700 is performed (1702) at a computing device having a display, one or more processors, and memory storing one or more programs configured for execution by the one or more processors. The method 1700 includes receiving (1704) user selection of a data source with geographic data. The method 1700 also includes displaying (1706) a data visualization user interface 100. The data visualization interface includes a schema information region 110, a data visualization region 112, and a plurality of shelf regions (e.g., a column shelf region 120 and a row shelf region 122). The schema information region 110 includes a plurality of user-selectable data fields (e.g., data field icons 410, 411, 412, 710, 1512, 1522, and 1532). Each shelf region of the plurality of shelf regions defines a respective characteristic of a data visualization to be displayed in the data visualization region. The method 1700 further includes receiving (1708) a first user input to place a first geographic data field (e.g., the data field 410) from the schema information region into the data visualization region. The method 1700 also includes, in response (1720) to the first user input, generating and displaying (1722) a map data visualization in the data visualization region 112 using coordinates (e.g., longitude data field represented by icon 420-1 and latitude data field represented by icon 420-2) associated with the first geographic data field. The map data visualization includes a first plurality of data marks (e.g., the visual marks 530) in a first layer (e.g., layer 520-1). The method 1700 further includes receiving (1730) a second user input to select a second geographic data field from the schema information region 110. The method 1700 also includes, in response (1731) to the second user input, displaying (1736) a new layer icon (e.g., the layer 520-2) in the schema information region. Upon activation of the new layer icon by the second geographic data field, the method superimposes (1738) a second layer over the existing map data visualization to form an updated map data visualization. The second layer includes a second plurality of data marks (e.g., the visual marks 540) that correspond to the second geographic data field (e.g., the data field 412).

In some implementations, the second user input includes (1739) user selection of a data field icon associated with the second geographic data field. In response to detecting the user selection of a data field icon associated with the second geographic data field, the method displays (1740) a predetermined drop region (e.g., the affordance 512) for generating a new layer in the data visualization region. The second user input further includes moving the data field icon associated with the second geographic data field to the predetermined drop region.

In some implementations, the method 1700 also includes associating (1732) a longitude data field (e.g., the longitude data field represented by the icon 420-1), corresponding to the first geographic data field, with a first shelf region (e.g., the column shelf region 120) of the plurality of shelf regions.

In some implementations, the method 1700 also includes associating (1733) a latitude data field (e.g., the latitude data field represented by the icon 420-2), corresponding to the second geographic data field, with a second shelf region (e.g., the row shelf region 122) of the plurality of shelf regions.

In some implementations, the method 1700 further includes displaying (1734) a first data field icon associated with the longitude data field in the first shelf region. For example, as shown in FIG. 4C, the data field icon 420-1 is associated with the longitude data field is displayed in the column shelf region.

In some implementations, the method 1700 also includes displaying (1735) a second data field icon associated with the latitude data field in the second shelf region. For example, as shown in FIG. 4C, the data field icon 420-2 is associated with the longitude data field is displayed in the row shelf region.

In some implementations, the latitude and longitude data fields are generated data fields (e.g., automatically generated data fields). For example, each of the latitude data field and the longitude data may be generated based on geographic data from a data field (e.g., the geographic data from data field 410, 411, 412, or 710).

In some implementations, the method 1700 further includes receiving (1742) a third user input to (i) select a third geographic data field from the schema information region 110 and (ii) place the third geographic data field onto a mark encoding shelf (e.g., the mark region 128) for the second layer. In response to third user input, the method encodes (1744) the second plurality of data marks according to the mark encoding shelf while maintaining the first plurality of data marks without encoding according to the mark encoding shelf.

In some implementations the third geographic data field is associated with the second geographic data field (e.g., it belongs to the same data table or is the same data field). For example, a user may add a new layer 510-2 corresponding the "Neighborhood" data field 410 and the user may also encode the visual marks in the layer 510-2 based on information stored in the "Neighborhood" data field 410.

In some implementations, the method 1700 further includes receiving (1746) one or more user inputs at a mark encoding shelf (e.g., the affordance 620-1 in the mark region 128) for the first layer to change encoding of the first plurality of data marks in a first layer. In response to receiving the one or more user inputs at the mark encoding shelf for the first layer, the method encodes (1748) the first plurality of data marks according to the one or more user inputs at the mark encoding shelf for the first layer while maintaining the second plurality of data marks in accordance with a mark encoding shelf for the second layer. For example, as shown in FIGS. 6A-6C, user placement of either the "Neighborhoods" data field 412 or the "Name" data field 610 from the "Boston_Neighborhoods" data table at the affordance 620-1 encodes the second set of visual marks 540 (including visual marks 540-1 and 540-2) corresponding to the "Neighborhoods" data field 412 by color by without encoding (or without changing encoding of) the first set of visual marks 530.

Encoding the first plurality of data marks in a first layer may include any of: changing the color, changing the size, and/or adding a label to the first plurality of data marks. A mark encoding shelf for the first layer (e.g., the tab for the first layer 510-1, in the marks region 128) and a mark encoding shelf for the second layer (e.g., the tab for the second layer 510-2, in the marks region 128) are independent of each other.

In some implementations, the method 1700 also includes, in response to the first user input, automatically displaying (1750) a first layer icon in the schema information region 110 that is associated with the first layer. The first layer icon (e.g., the layer icon 520-1) is distinct from the new layer icon associated with the second layer (e.g., the layer icon 520-2).

In some implementations, the method 1700 also includes receiving (1751) user selection of the first layer icon. In response to user selection of the first layer icon, the method activates (1752) the first layer in the data visualization region as the active layer. In some implementations, displaying the first layer icon in the schema information region as being the active layer includes expanding the first layer icon and displaying one or more encoding options corresponding to the first layer.

In some implementations, the method 1700 further includes, in response to the second user input, automatically activating (1753) the second layer in the data visualization region as an active layer. In some implementations, the second user input to add the second layer is received while the first layer is the active layer.

In some implementations, the method 1700 also includes receiving (1754) user selection of the first layer icon while the second layer is the active layer, and in response to user selection of the first layer icon, activating (1755) the first layer in the data visualization region as an active layer so that the second layer is no longer the active layer (e.g., replacing the second layer with the first layer as the active layer).

In some implementations, the method 1700 also includes, while the second layer is the active layer, receiving (1756) user selection of one of the first plurality of data marks. In response (1757) to user selection of the first plurality of data marks, the method activates (1758) the first layer in the data visualization region as the active layer (e.g., displaying the tab corresponding to the first layer in an expanded view to display encoding options and affordances), and displays (1759) the first layer icon in the schema information region as being the active layer (e.g., so that the second layer is no longer the active layer, or replacing the second layer with the first layer as the active layer).

In some implementations, the method 1700 further includes receiving (1760) user input (e.g., the selection box 1100 or 1122) to select one or more data marks in the data visualization. Examples of user selection of data marks are provided with respect to FIGS. 11A-11D.

In some implementations, the method 1700 also includes determining (1762) the selectability status of the first layer and the selectability status of the second layer. The method 1700 also includes, in response to receiving the user input and in accordance with a determination that the first layer is selectable, selecting (1764) a subset of the first plurality of data marks according to the user input to select one or more data marks in the data visualization. The method 1700 also includes in response to receiving the user input and in accordance with a determination that the second layer is selectable, selecting (1766) a subset of the second plurality of data marks according to the user input to select one or more data marks in the data visualization. Examples of changing a selection status of visual marks corresponding to a layer of a data visualization are provided with respect to FIGS. 11A-11D.

In some implementations, the first plurality of data marks include data marks that span a first geographical area, and the method 1700 includes receiving (1770) user input to add the first layer to the zoom extent of the data visualization. The zoom extent specifies which map layers determine the default zoom level for the data visualization. In response to receiving the user input to add the first layer to a zoom extent of the data visualization, the method updates (1772) the home screen of the data visualization to include the first geographical area. Zoom extent functionality of the graphical user interface 100 is described with respect to FIG. 12.

In some implementations, the second plurality of data marks include data marks that span a second geographical area that is different from the first geographical area, and the method 1700 includes receiving (1774) user input to add the second layer to a zoom extent of the data visualization. In response to receiving the user input to add the second layer to a zoom extent of the data visualization, the method updates (1776) the home screen of the data visualization to include the second geographical area.

In some implementations, the method 1700 also includes automatically displaying layer icons in the schema information region (e.g., the marks region 128 of the schema information region 110) in a display order based on an order of data fields that are added to the data visualization.

In some implementations, the method 1700 also includes receiving user input to change the display order of layer icons in the schema information region (e.g., the marks region 128 of the schema information region 110). In response to receiving the user input to change the display order of the layer icons in the schema information region, the method updates the schema information region to display the layer icons based on the user input. The user input may be any of: drag and drop, a selection of a "move up" option, or a selection of a "move down" option. In some implementations, the method 1700 automatically displays the second layer icon above first layer icon when the second layer is added to the data visualization after the first layer. Later, a user may provide input to display the first layer icon above the second layer icon.

In some implementations, the method 1700 also includes receiving user input to form a group including the first layer and the second layer, and receiving user input to apply a new setting to the group. The new setting corresponds to any of the visibility of the group and a selectability of the group. The method 1700 further includes, in response to receiving the user input to apply the new setting to the group, updating one or more settings of the first layer to correspond to the new setting and updating one or more settings of the second layer to correspond to the new setting. In some implementations the one or more settings of the first layer and the one or more settings of the second layer are concurrently (e.g., simultaneously and/or automatically) updated (e.g., updated at the same time).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating map data visualizations with multiple map layers, comprising:

at a computing device having one or more processors and memory storing one or more programs configured for execution by the one or more processors:

receiving a first user input that includes user selection of a first data field of a data source from a schema information region of a user interface and placement of the first data field into a data visualization region of the user interface;

in response to receiving the first user input:

in accordance with a determination that the first data field corresponds to a geographic data field:

determining longitude and latitude information for data values of the first data field;

generating a map data visualization corresponding to the first data field according to the determined longitude and latitude information, the map data visualization including a first layer having a first set of data marks corresponding to the first data field, wherein the first set of data marks includes data marks that span a first geographical area; and displaying, in the data visualization region, the map data visualization including the first set of data marks;

receiving a second user input to add the first layer to a zoom extent of the map data visualization, the zoom extent specifying which map layers determine a default zoom level for the map data visualization; and in response to receiving the second user input to add the first layer to the zoom extent, updating a home screen of the map data visualization to include the first geographical area.

2. The method of claim 1, wherein the user interface includes a plurality of shelf regions, each shelf region of the plurality of shelf regions defining a respective characteristic of a data visualization to be displayed in the data visualization region; and the method further comprises:

after determining the longitude and latitude information for the data values of the first data field:

generating (i) a longitude field corresponding to the longitude information and (ii) a latitude field corresponding to the latitude information;

representing the longitude field as a first icon and the latitude field as a second icon;

displaying the first icon in a first shelf region of the plurality of shelf regions; and displaying the second icon in a second shelf region of the plurality of shelf regions.

3. The method of claim 1, further comprising:

receiving a third user input to drag a second geographic data field of the data source from the schema information region;

in response to the receiving the third user input, displaying a new layer icon in the data visualization region; and upon activation of the new layer icon by dropping the second geographic data field onto the new layer icon, superimposing a second layer over the map data visualization to form an updated map data visualization, wherein the second layer includes a second set of data marks corresponding to the second geographic data field.

4. The method of claim 3, wherein:

the displaying the new layer icon in the data visualization region is further in accordance with a determination that a shelf region of the user interface includes a data field icon associated with a longitude data field and/or a latitude data field, the shelf region defining a respective characteristic of a data visualization to be displayed in the data visualization region.

5. The method of claim 3, wherein the activation of the new layer icon by the second geographic data field occurs when the second geographic data field is released after hovering over the new layer icon in the data visualization region.

6. The method of claim 3, further comprising:

in response to detecting a fourth user input to hover over a displayed data mark of the second set of data marks, displaying a floating window that includes a label and characteristics for the displayed data mark.

7. The method of claim 3, wherein:

the third user input includes user selection of a data field icon associated with the second geographic data field; and the method further comprises:

in response to detecting the user selection of the data field icon associated with the second geographic data field, displaying a predetermined drop region for generating a new layer in the data visualization region, wherein the third user input further includes moving the data field icon associated with the second geographic data field to the predetermined drop region.

8. The method of claim 3, further comprising:

receiving a fourth user input to (i) select a third geographic data field of the data source from the schema information region and (ii) place the third geographic data field onto a mark encoding shelf for the second layer; and in response to receiving the fourth user input, encoding the second set of data marks according to the mark encoding shelf while maintaining the first set of data marks without encoding according to the mark encoding shelf.

9. The method of claim 3, further comprising:

receiving one or more user inputs at a mark encoding shelf for the first layer to change encoding of the first set of data marks in the first layer; and in response to receiving the one or more user inputs at the mark encoding shelf for the first layer, encoding the first set of data marks according to the one or more user inputs at the mark encoding shelf for the first layer while maintaining the second set of data marks in accordance with a mark encoding shelf for the second layer.

10. The method of claim 3, further comprising:

in response to receiving the first user input, automatically displaying a first layer icon in the schema information region, wherein the first layer icon is (i) associated with the first layer and is (ii) distinct from the new layer icon associated with the second layer.

11. The method of claim 10, further comprising:

receiving user selection of the first layer icon; and in response to receiving the user selection of the first layer icon, activating the first layer in the data visualization region as an active layer.

12. The method of claim 11, further comprising:

receiving user selection of the first layer icon while the second layer is the active layer; and in response to receiving the user selection of the first layer icon, activating the first layer in the data visualization region as the active layer.

13. The method of claim 11, further comprising:

while the second layer is the active layer, receiving user selection of a first data mark of the first set of data marks; and in response to receiving the user selection of the first data mark:

activating the first layer in the data visualization region as the active layer; and displaying an indication, in the schema information region, that the first layer is active.

14. The method of claim 3, further comprising:

receiving user input, in the data visualization region, to select one or more data marks in the map data visualization;

determining a selectability status of the first layer and a selectability status of the second layer;

in response to receiving the user input, and in accordance with a determination that the first layer is selectable, selecting a first subset of the first set of data marks according to the user input; and in response to receiving the user input, and in accordance with a determination that the second layer is selectable, selecting a second subset of the second set of data marks according to the user input.

15. A computing device, comprising:

one or more processors; and memory coupled to the one or more processors, the memory storing one or more programs configured to be executed by the one or more processors, the one or more programs including instructions for:

receiving a first user input that includes user selection of a first data field of a data source from a schema information region of a user interface and placement of the first data field into a data visualization region of the user interface;

in response to receiving the first user input:

in accordance with a determination that the first data field corresponds to a geographic data field:

determining longitude and latitude information for data values of the first data field;

generating a map data visualization corresponding to the first data field according to the determined longitude and latitude information, the map data visualization including a first layer having a first set of data marks corresponding to the first data field, wherein the first set of data marks includes data marks that span a first geographical area; and displaying, in the data visualization region, the map data visualization including the first set of data marks;

receiving a second user input to add the first layer to a zoom extent of the map data visualization, the zoom extent specifying which map layers determine a default zoom level for the map data visualization; and in response to receiving the second user input to add the first layer to the zoom extent, updating a home screen of the map data visualization to include the first geographical area.

16. The computing device of claim 15, the one or more programs including instructions for:

receiving a third user input to drag a second geographic data field of the data source from the schema information region;

in response to receiving the third user input, displaying a new layer icon in the data visualization region; and upon activation of the new layer icon by dropping the second geographic data field onto the new layer icon, superimposing a second layer over the map data visualization to form an updated map data visualization, wherein the second layer includes a second set of data marks corresponding to the second geographic data field.

17. The computing device of claim 16, the one or more programs including instructions for:

in response to detecting a fourth user input to hover over a displayed data mark of the second set of data marks, displaying a floating window that includes a label and characteristics for the displayed data mark.

18. The computing device of claim 16, wherein: the third user input includes user selection of a data field icon associated with the second geographic data field; and the one or more programs further include instructions for:

in response to detecting the user selection of the data field icon associated with the second geographic data field, displaying a predetermined drop region for generating a new layer in the data visualization region, wherein the third user input further includes moving the data field icon associated with the second geographic data field to the predetermined drop region.

19. A non-transitory computer-readable storage medium storing one or more programs, the one or more programs comprising instructions, which when executed by a computing device having one or more processors, and memory, cause the computing device to perform operations comprising:

receiving a first user input that includes user selection of a first data field of a data source from a schema information region of a user interface and placement of the first data field into a data visualization region of the user interface;

in response to receiving the first user input:

in accordance with a determination that the first data field corresponds to a geographic data field:

determining longitude and latitude information for data values of the first data field;

generating a map data visualization corresponding to the first data field according to the determined longitude and latitude information, the map data visualization including a first layer having a first set of data marks corresponding to the first data field, wherein the first set of data marks includes data marks that span a first geographical area; and displaying, in the data visualization region, the map data visualization including the first set of data marks;

receiving a second user input to add the first layer to a zoom extent of the map data visualization, the zoom extent specifying which map layers determine a default zoom level for the map data visualization; and in response to receiving the second user input to add the first layer to the zoom extent, updating a home screen of the map data visualization to include the first geographical area.

20. The non-transitory computer-readable storage medium of claim 19, the operations further comprising:

receiving a third user input to drag a second geographic data field of the data source from the schema information region;

in response to the receiving the third user input, displaying a new layer icon in the data visualization region; and upon activation of the new layer icon by dropping the second geographic data field onto the new layer icon, superimposing a second layer over the map data visualization to form an updated map data visualization, wherein the second layer includes a second set of data marks corresponding to the second geographic data field.

* * * * *